United States Patent
Sun et al.

(10) Patent No.: US 10,566,797 B2
(45) Date of Patent: Feb. 18, 2020

(54) POWER ELECTRONIC CONVERTER BASED SYNCHRONIZER FOR GENERATORS

(71) Applicant: Mitsubishi Electric Research Laboratories, Inc., Cambridge, MA (US)

(72) Inventors: Hongbo Sun, Lexington, MA (US); Shahil Shah, Troy, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 264 days.

(21) Appl. No.: 15/457,253

(22) Filed: Mar. 13, 2017

(65) Prior Publication Data

US 2018/0262009 A1 Sep. 13, 2018

(51) Int. Cl.
*H02J 3/38* (2006.01)
*H02J 13/00* (2006.01)

(52) U.S. Cl.
CPC .............. *H02J 3/383* (2013.01); *H02J 3/386* (2013.01); *H02J 13/0006* (2013.01)

(58) Field of Classification Search
CPC ................. H02J 3/381; H02J 3/08; H02J 3/14
USPC .......................................................... 307/84
See application file for complete search history.

(56) References Cited

U.S. PATENT DOCUMENTS

| | | | |
|---|---|---|---|
| 5,640,060 A | 6/1997 | Dickson et al. | |
| 6,934,306 B1* | 8/2005 | Park ..................... | H04B 17/364 370/517 |
| 7,915,868 B1 | 3/2011 | Maters et al. | |
| 2003/0222507 A1 | 12/2003 | Deng et al. | |
| 2005/0151377 A1 | 7/2005 | Ichinose et al. | |
| 2009/0108678 A1* | 4/2009 | Algrain ................. | H02J 3/005 307/87 |
| 2010/0148588 A1* | 6/2010 | Algrain ................. | H02P 5/50 307/84 |
| 2011/0248569 A1* | 10/2011 | Son ........................ | H02J 3/381 307/87 |
| 2012/0190554 A1* | 7/2012 | Hartig ................... | B60L 50/13 505/166 |

(Continued)

FOREIGN PATENT DOCUMENTS

| | | |
|---|---|---|
| EP | 2651000 A2 | 2/2014 |
| WO | 2014155647 A1 | 10/2014 |

*Primary Examiner* — Daniel Kessie
*Assistant Examiner* — Swarna N Chowdhuri
(74) *Attorney, Agent, or Firm* — Gennadiy Vinokur; James McAleenan; Hironori Tsukamoto

(57) ABSTRACT

A power system including a first grid and a second grid, each grid having power flow parameters. A breaker installed at a point of common coupling between the first grid and second grid. A first sensor and a second sensor, each located on a side of the point of the common coupling for continually determining the power flow parameters of the first grid and second grid. Wherein the power flow parameters for the first and second grid are indicative of a frequency and a phase. A power source for supplying power to either the first grid or second grid. A controller for synchronizing the frequencies and the phases of the first and second grid, by continually adjusting an amount of power supplied, based on continually determining a frequency mismatch and a phase mismatch between the first grid and second grid, until a first predetermined condition is met.

20 Claims, 19 Drawing Sheets

(56) References Cited

U.S. PATENT DOCUMENTS

| | | | |
|---|---|---|---|
| 2013/0162035 A1* | 6/2013 | Sullivan | H02H 7/261 307/18 |
| 2014/0252863 A1* | 9/2014 | Patel | H02J 3/44 307/82 |
| 2014/0265596 A1* | 9/2014 | Yuan | H02J 3/382 307/69 |
| 2016/0266559 A1 | 9/2016 | Shi et al. | |
| 2016/0329714 A1* | 11/2016 | Li | H02M 7/44 |
| 2017/0214249 A1* | 7/2017 | Seeley | H02J 3/44 |
| 2018/0287391 A1* | 10/2018 | Shibata | H02J 3/40 |

* cited by examiner

Step 110) Processor of Controller continuously obtains measurement data from Sensor 1 of a generator of Grid 1 and Sensor 2 of a generator of Grid 2.

Step 120) Processor of Controller continually determines power flow parameters for first grid and second grid at sides of common coupling via breaker, wherein the power flow parameters for the first and the second grid are indicative of at least a phase and a frequency.

Step 130) Controller synchronizes the phases and the frequencies of the first and the second grid, by continually adjusting an amount of power supplied from a power source, based on continually determining a frequency mismatch and a phase mismatch between the first grid and the second grid, until a first predetermined condition is met.

Step 140) Controller verifies when first predetermined condition met, moves breaker from an open position to a close position.

FIG. 1A

Step 110) Processor of Controller obtains measurement data from Sensor 1 of a generator of 1st grid and Sensor 2 of a generator of 2nd grid

Step 120) Processor of Controller determines power flow parameters (i.e. a phase and a frequency) for 1st and 2nd grid at sides of common coupling via breaker

Step 130) Controller synchronizes the phases and the frequencies of the 1st and 2nd grid, by iteratively adjusting an amount of power supplied from a power source, until a first predetermined condition is met, and each step includes:

1) Determining a frequency reference through the phase control compensator according to the determined frequency mismatch between the 1st and 2nd grid 2) Determining an active power reference through the frequency control compensator according to the determined frequency reference and the determined frequency mismatch between the 1st and 2nd grid 3) Limiting the determined active power reference with a predetermined threshold through the saturation block 4) Regulating the three-phase currents injected into the 1st or 2nd grid through the dq-current control of the VSC convertor according to determined power reference

Step 140) Controller verifies when first predetermined condition met, moves breaker from an open position to a close position

FIG. 1D

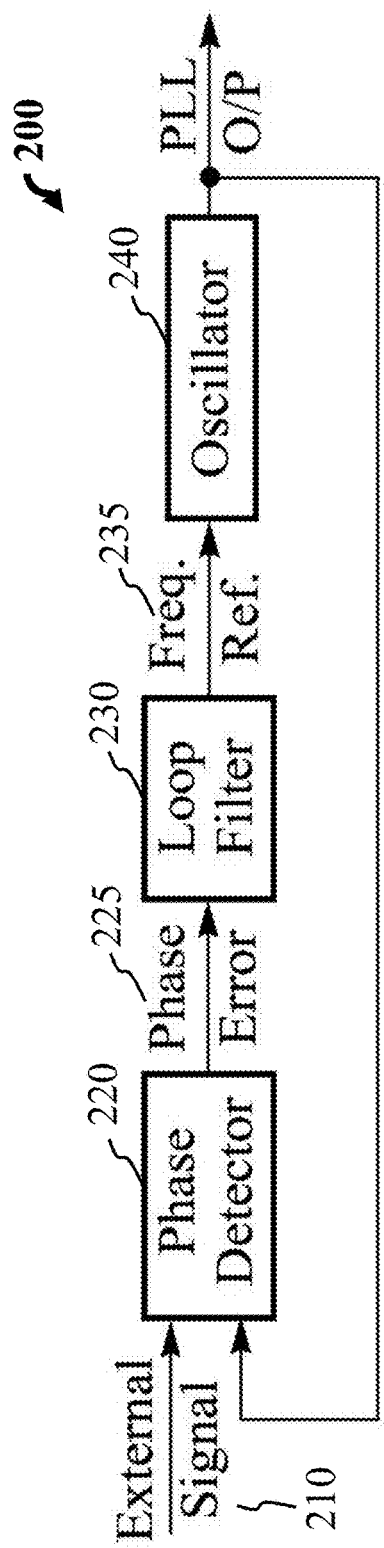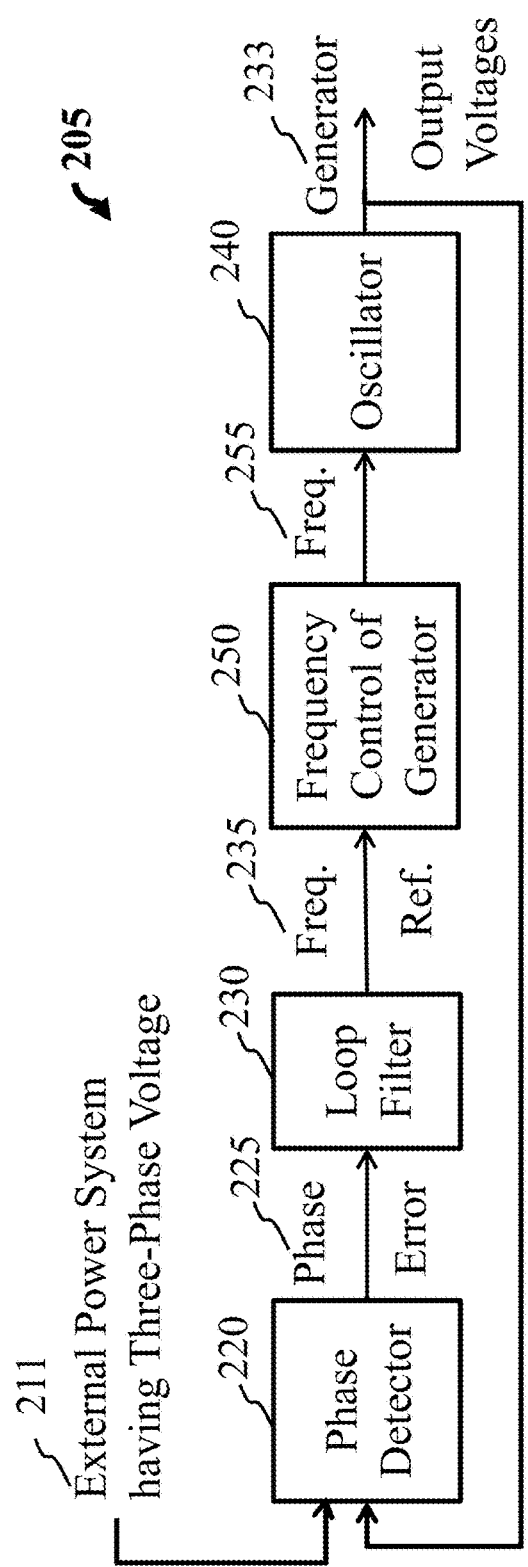
FIG. 2A
FIG. 2B

POWER ELECTRONIC CONVERTER BASED SYNCHRONIZER FOR GENERATORS

FIELD

The present disclosure relates generally to controlling of generation units in electric power systems, and more particularly to synchronization of a generation unit or a group of distributed generation units to an electric power system.

BACKGROUND

Electric power systems have multiple generation units that operate in synchronism under a normal operation. That is, frequency, phase, and amplitude of voltages at the terminals of a generator hold a fixed relationship with the same parameters of the remaining generators in the power system. Before a generator can be connected to an electric power system, the frequency, phase, and amplitude of the voltages at its bus need to be matched with those of the power system at the point of interconnection. Once, the so called synchronization parameters are matched within a desired tolerance, the generator breaker is closed. Any mismatch in the synchronization parameters during connection of a generation unit by a generator breaker may result in undesired transients and disruption of the system.

Concept of microgrid, in which several small distributed generation units operate together to form a small power system, is finding increasing acceptance as a solution to increase the share of renewable energy resources. A microgrid may be operated in either of the following two modes: grid-connected mode and island mode. In grid-connected model, entire microgrid constituting several distributed generation units operate as a single generator from the perspective of the main grid. Hence, synchronization of a microgrid with the main grid is further challenging as the synchronization parameters of the microgrid at the point of interconnection with the main grid depends on several generation units. Synchronization process may also require communication among the distributed generation units in the microgrid.

There are several problems with the current synchronization method, both for single generation units, as well as for a microgrid with a group of distributed generation units. Synchronization is achieved using the frequency and voltage control of the generation units. Frequency control is responsible for fulfilling the frequency and phase matching requirements for the synchronization. Voltage control on the other hand is responsible for fulfilling the amplitude matching requirement. Speed of both the frequency and voltage control are slow in generation units as they are designed for a steady-state performance, synchronization is an auxiliary function for them and they are not designed for it. Moreover, for generation units based on rotating machines, the bandwidth of the frequency control is further limited by slow mechanical dynamics. The reliance on the controls of a generation unit for synchronization increases time required for connection the units with an electric power system.

Frequency control of generation units in power systems is usually implemented at different hierarchical levels to coordinate generation units distributed over a wide geography. These levels are generally referred as primary, secondary, and tertiary control. Primary control is implemented locally at the generation units and its bandwidth is limited by the generation unit characteristics. Secondary control is implemented at a central controller and it provides a frequency reference to the primary control of the generation units. Secondary control bandwidth is kept much lower than the primary control to avoid conflict between both these controls. Moreover, secondary control also relies on communication for coordination among the generation units. For microgrids, constituting several generation units, synchronization function is achieved by the secondary control for regulating the synchronization parameters at the point of interconnection of the microgrid with the main grid. It can be inferred from the above discussion that the speed of synchronization is severely constrained when it is achieved by the secondary control of the generation units, as in the current solution for the synchronization. In fact, synchronization using the frequency and voltage control of the generation units require several minutes. The slow synchronization may not be acceptable in future power systems where it may be desired to change the power system configuration dynamically and adaptively over time.

A problem with the current synchronization process for a group of distributed generation units in a microgrid is the requirement of communication among the generation units as the synchronization process is achieved using the secondary control.

Another problem with the current synchronization process is that the phase angle remains an uncontrolled variable. Moreover, it is kept uncontrolled even during the synchronization process, as discussed in U.S. Pat. No. 7,915,868 B1. Because of this, the phase matching requirement for the synchronization is achieved indirectly by maintaining a frequency difference between a generation unit or a microgrid and the electric power system. Due to the frequency difference, phase angle difference between the generation unit and the electric power system changes gradually and the generator breaker is closed when the phase angle difference is within a prescribed limit. This makes the synchronization time highly variable and dependent on the initial phase angle difference and the frequency offset. Higher frequency offset is required to increase the speed at which the phase angle difference evolves with time. However, this is detrimental to the synchronization performance as high frequency offset may result in large transient during interconnection. On the other hand, low frequency offset for phase synchronization takes exceedingly a long time due to the "waiting process" described in EP 2651000 A2.

Therefore, there is a need for developing fast synchronization of a generation unit or a microgrid with several generation units with an electric power system. Moreover, it is desired that the system should be located at the point of interconnection and should rely on measurement of only the local variables in order avoid communication requirement. Further, the system should actively regulate the phase angle during the synchronization process to eliminate the "waiting process". Finally, the measurement method of the phase angle should be able to mitigate errors introduces by the harmonics and unbalance present in the three-phase voltages of the generation unit and the electric power system.

SUMMARY

The present disclosure relates generally to controlling of generation units in electric power systems, and more particularly to synchronization of a generation unit or a group of distributed generation units to a power system.

The embodiments of the present disclosure are based on addressing synchronization of a generation unit or a power grid to another power grid. In particular, how to close a switch that connects the grids, timely to provide for fast synchronization, and to avoid grid collapse. At least one reason the present disclosure needed to identify such solutions, is that switch closings are a concern due to more power electronics based devices being installed in today's power systems. For example, the power system of today has much less inertia than before, and thus has less time for the power system to act for emergencies, including, closing switches to re-configure them. In other words, switch closing requires the voltage magnitude and phase angles between two terminals of switches to be synchronized, and this synchronization process takes a long time to synchronize the two energized sections. In order to find solutions to a faster synchronization, the present disclosure focused on challenges presented by switch closing, among other things.

We realized through extensive experimentation, the problem we needed to solve included how to perform synchronization between generators or power grids before connecting them into a common grid. For example, we initially experimented with performing synchronization between generators by controlling the generator, i.e. the power produced by each generator, to be connected to the grid. However, we found that such synchronization was slow, and required long-distant communication, and that direct parameter of synchronization was only frequency, not the phase. The phase is synchronized by preserving a gap between the synchronized frequencies over a period of time. We learned, among other things, that the cause of the problem is due to the dynamics of the generator are too slow for rapid synchronization. Specifically, when reviewing the principles of the droop speed control, the frequency of a generator is directly proportional to its speed, the speed can be changed by mechanical components of the generator, and they are slow. We discovered that the phase along with the frequency needs to be incorporated in our solution to fast synchronization.

To overcome the slowness of the dynamics of the generator and to provide for fast synchronization without collapsing the common grid, among other things, we discovered we could replace the synchronization device with a power device having faster dynamics.

To better understand synchronization and our realization, it is first important to comprehend the aspects of synchronization of a generator. We understood that synchronizing a generator includes matching of the amplitude, frequency, and phase of the three-phase output voltages of the generator with the same parameters of the power system with which the generator is synchronized. For example, power systems have multiple generation units that operate synchronously under a normal operation, in that, frequency, phase, and amplitude of voltages at the terminals of a generator hold a fixed relationship with the same parameters of the remaining generators in the power system. Before a generator can be connected to an electric power system, we understood the frequency, phase, and amplitude of the voltages at its bus need to be matched, i.e., synchronized, with those of the power system at the point of interconnection. Once, the synchronization parameters are matched within a desired tolerance, the generator breaker can be closed. Any mismatch in the synchronization parameters after the connection of a generation results in undesired transients and disruption of the system. Such undesired transients and disruption can lead to added expense, safety relates incidents and/or potential failure of mechanical components of the power system.

Embodiments of the present disclosure are based upon the realization, that where active and reactive power flow is injected or extracted from a generator or microgrid, that in order for synchronization to occur, we need to control the synchronization parameters. Specifically, we realized we could use a power converter based synchronizer to synchronize the generator, wherein the synchronization of the active and reactive power regulation is done at the point of interconnection with the main power system. We came to understand that we could use the converter based synchronizer to synchronize the generator, or alternatively, the generator could be replaced by several generators connected in parallel or to a microgrid.

As active power injection is required by a power converter at the point of interconnection, a source/sink of power is required in the converter based synchronizer. For example, the converter can be supplied by a direct current (DC) voltage source with a voltage magnitude $v_{dc}$. The DC side can be supplied by any DC source, such as batteries or fuel cells. The converter injects or extracts three-phase currents to the connected first grid or the second grid.

We found that the converter based synchronizer can control the synchronization parameters for synchronization of the generator, by matching of the amplitude, frequency, and phase of the three-phase output voltages of generator with the same synchronization parameters of the power system with which the generator is synchronized.

Further that the amplitude of the output three-phase voltages can be controlled by regulating the injection of the reactive power flow by the converter based synchronizer. More importantly, among other things, is that the frequency and phase are both controlled by regulating the active power injection by the converter based synchronizer. We recognized it is also important to have an appropriate control architecture and design of the frequency and phase control, so as to avoid conflict between them, as they both are controlled by the same controlling variable, i.e. active power injection. The present disclosure provides systems, in which the coordination problem between the phase and frequency control can be resolved by framing the synchronization problem as a phase-locked loop (PLL) problem.

PLLs can be used to detect phase and frequency of a periodic wave. They find applications in grid-connected converters to detect phase of the grid voltage required for the control of converters. The PLL consist of three components: phase detector, loop filter, and internal oscillator. Phase detector estimates the error between the phases of an external signal and internal oscillator. The output of the phase detector is passed through a loop filter to remove the high frequency components and generate a frequency reference for the oscillator. As the oscillator is implemented by fast analog circuit or digitally in signal processors, the frequency of the oscillator output instantaneously follows the frequency reference from the loop filter. To properly design the PLL, error between the phases of the external signal and the oscillator output should go to zero after a disturbance. Moreover, the frequency of the oscillator coincides with the frequency of the external signal in the steady-state.

According the present disclosure, the generator or microgrid can be considered as an oscillator in the PLL whose frequency and phase need to be matched with an external signal, three-phase voltages of the electric power system at the point of interconnection. However, the oscillator in normal PLL whose frequency instantaneously follows the reference from the loop filter, requires an additional frequency control mechanism for the generator or microgrid. Resulting, in the frequency control mechanism that can be implemented by a converter. Which means, this frames the generator synchronizer problem as a PLL problem without presuming any particular PLL structure, which means that any PLL structure can be used to improve the synchronization performance. Hence, different PLL techniques are covered by the present disclosure.

Another aspect of the present disclosure, is that the converter based synchronizer can employ the phase detector to estimate the phase difference between the three-phase voltages of a generator or microgrid and the main electrical power system. At least one approach is to directly compare the terminal voltages of generator and electrical power system using X-OR gates or a zero crossing detection circuit. However, they do not compensate the errors introduced by harmonics and unbalances in the voltages. We note that the according to the present disclosure, the phase of three-phase voltages can be estimated using fast PLL circuits.

According to an embodiment of the disclosure, a power system includes a first grid including a first generator having first power flow parameters and a second grid including a second generator having second power flow parameters. A breaker installed at a point of common coupling between the first grid and the second grid. Wherein the breaker in an open position separates the first grid from the second grid, and in a close position connects the first grid with the second grid. A first sensor located on a side of the point of the common coupling for continually determining the power flow parameters of the first grid. A second sensor located on an other side of the point of the common coupling for continually determining the power flow parameters of the second grid. Wherein the power flow parameters for the first and the second grid are indicative of at least a frequency and a phase. A power source for supplying power to either the first grid or the second grid. A controller in communication with the sensors and the power source, for synchronizing at least the phases and the frequencies of the first and the second grid, by continually adjusting an amount of power supplied from the power source, based on continually determining a frequency mismatch and a phase mismatch between the first grid and the second grid, until a first predetermined condition is met. Wherein the breaker changes position from the open position to the close position, when the first predetermined condition is met. The power flow parameters are from the group consisting of a frequency, a phase angle, a voltage magnitude and a phase sequence.

According to another embodiment of the disclosure, a synchronizer for a power system having a first grid having a first generator with first power flow parameters, and a second grid having a second generator with second power flow parameters. A breaker installed at a point of common coupling between the first grid and the second grid. Wherein the breaker in an open position separates the first grid from the second grid, and in a close position connects the first grid with the second grid. The synchronizer including a first sensor located on a side of the point of the common coupling for continually determining the power flow parameters of the first grid. A second sensor located on an other side of the point of the common coupling for continually determining the power flow parameters of the second grid. Wherein the power flow parameters of the first and the second grid are indicative of at least a frequency and a phase. A power source for supplying power to either the first grid or the second grid. A controller in communication with the sensors and the power source, for synchronizing at least the phases and the frequencies of the first and the second grid, by continually adjusting an amount of power supplied from the power source, based on continually determining a frequency mismatch and a phase mismatch between the first grid and the second grid, until a first predetermined condition is met. Wherein the breaker changes position from the open position to the close position, when the first predetermined condition is met.

According to another embodiment of the disclosure, synchronizer for a power system having a generator having first power flow parameters, a grid having a grid generator having second power flow parameters. A breaker installed at a point of common coupling between the generator and the grid. Wherein the breaker in an open position separates the generator from the grid, and in a close position connects the generator with the grid. The synchronizer including a first sensor located on a side of the point of the common coupling for continually determining power flow parameters of the generator. A second sensor located on an other side of the point of the common coupling for continually determining power flow parameters of the grid. Wherein the power flow parameters for the generator and the grid are indicative of at least a frequency and a phase angle. A power source for supplying power to either the generator or the grid. A controller in communication with the sensors and the power source, for synchronizing at least the phases and the frequencies of the generator and the grid, by continually adjusting an amount of power supplied from the power source, based on continually determining a frequency mismatch and a phase mismatch between the generator and the grid, until a first predetermined condition is met. Wherein the breaker changes position from the open position to the close position, when the first predetermined condition is met.

Further features and advantages of the present disclosure will become more readily apparent from the following detailed description when taken in conjunction with the accompanying Drawing.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 1A is a schematic block diagram of steps of a fast synchronization system for two energized grids, according to some embodiments of the present disclosure;

FIG. 1D is a schematic block diagram of step 130 of the fast synchronization system, according to some embodiments of the present disclosure;

FIGS. 2A and 2B are schematic block diagrams of the generator synchronization problem using phase-locked loop (PLL) structure, FIG. 2A illustrates the general structure of PLL, and FIG. 2B illustrates the modified PLL structure for generator synchronization, according to some embodiments of the present disclosure;

3A is a generator connected with the grid; FIG. 3B is a primary control of the generator of FIG. 3A; and FIG. 3C is secondary control of the generator of FIG. 3A.

FIGS. 4A, 4B and 4C are exemplar prior-art graphic plots of performance of synchronization using the generator controls of FIG. 3A; wherein FIG. 4A illustrates frequency in Hz (see dashed line that is the grid frequency and the solid line is the generator frequency, and dotted line is frequency reference to primary control, $$\frac{\omega_{sec}}{2\pi}\bigg);$$

FIG. 4B illustrates phase error in radians; and FIG. 4C illustrates inrush currents after the generator breaker is closed.

FIG. 7A illustrates frequency in Hz, such that the dashed line is grid frequency and solid line is generator frequency, and FIG. 7B illustrates phase error in radians, wherein the VSC-based synchronizer is activated when the frequency error is less than a predetermined threshold, such as 0.2 Hz, according to some embodiments of the present disclosure;

FIG. 8A illustrates the loop gains of frequency control and FIG. 8B illustrates the loop gains of phase control, wherein the solid lines show responses for different ratings of the VSC-based synchronizer (ratings are represented as percentage of the generator rating), the dashed lines show response for the ideal synchronizer (infinite rating), according to some embodiments of the present disclosure;

Figure 1B:
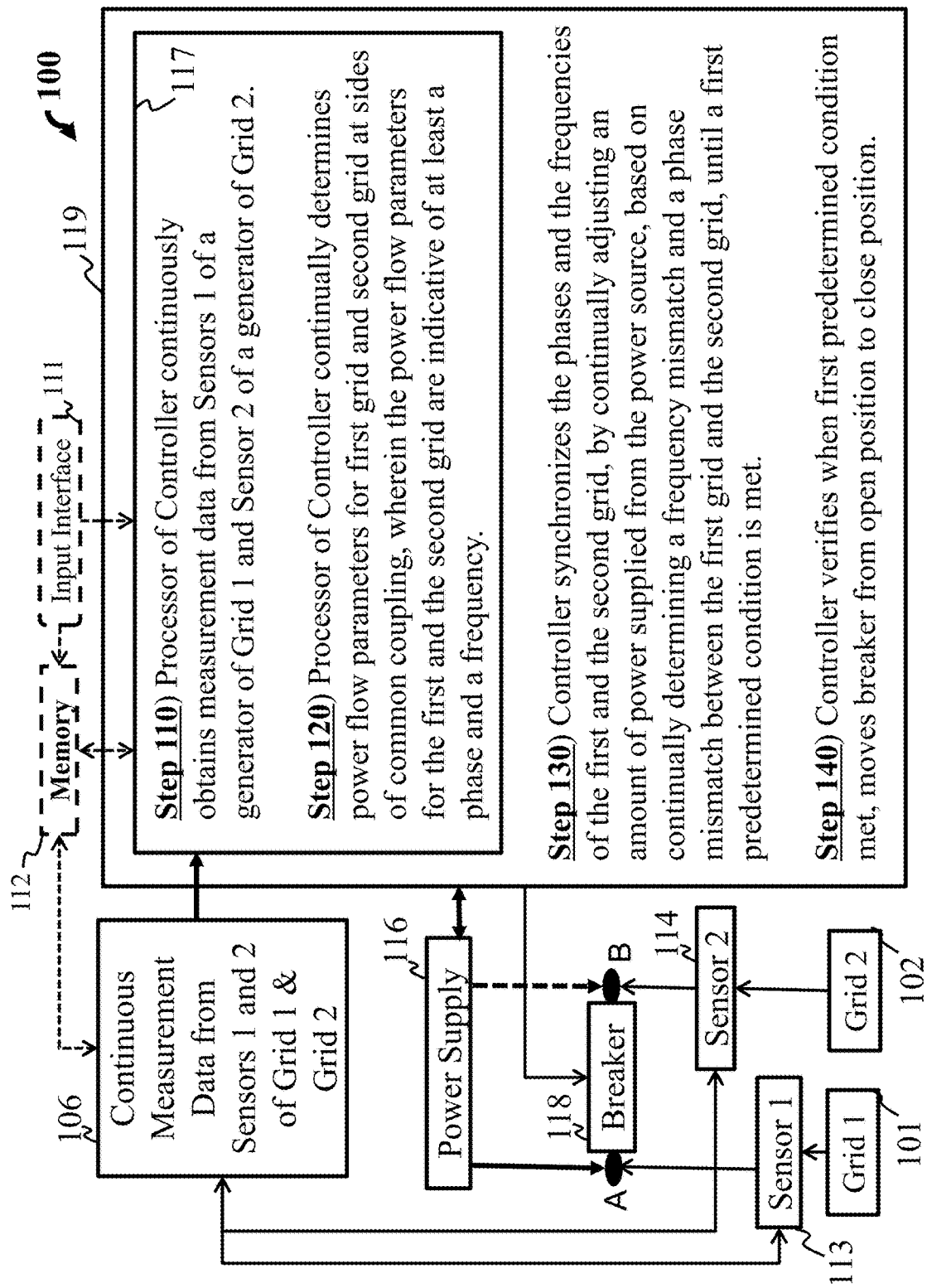
FIG. 1B is a schematic illustrating steps of the fast synchronization system along with components of the system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to controlling generation units in electric power systems, and in particular to synchronization of a generation unit or a group of distributed generation units to a power system.

The embodiments of the present disclosure are based on addressing synchronization of a generation unit or a power grid to another power grid. Specifically, how to close a switch that connects the grids, timely to provide for fast synchronization, and to avoid grid collapse. Switch closings are a concern with more power electronics based devices installed in power systems. For example, today's power system has much less inertia than before, and thus has less time for the power system to act for emergencies, including, closing switches to re-configure them. In other words, switch closing requires the voltage magnitude and phase angles between two terminals of switches to be synchronized, and this synchronization process takes a long time to synchronize the two energized sections.

We realized the problem to solve included how to perform synchronization between generators or power grids before connecting them into a common grid. Through experimentation, we discovered we could replace the synchronization device with a power device or power converter based synchronizer, that provides for faster dynamics, to overcome the slowness of the dynamics of the generator of today's devices and to provide for fast synchronization without collapsing the common grid, among other things.

Embodiments of the present disclosure are based upon the realization, that where active and reactive power flow is injected or extracted from a generator or microgrid, that in order for synchronization to occur, we need to control the synchronization parameters. Specifically, we realized we could use a power converter based synchronizer to synchronize the generator, wherein the synchronization of the active and reactive power regulation is done at the point of interconnection with the main power system. We further learned we could use the converter based synchronizer to synchronize the generator, or alternatively, the generator could be replaced by several generators connected in parallel or to a microgrid.

As active power injection is required by a power converter at the point of interconnection, a source/sink of power is required in the converter based synchronizer of the present disclosure. For example, the converter based synchronizer can be supplied by a direct current (DC) voltage source with a voltage magnitude $v_{dc}$. The DC side can be supplied by any DC source, such as batteries or fuel cells. We note that this can be realized by another converter that draws power from an auxiliary alternating current (AC) source or the main electric power system. Optionally, any topology can be configured for the converter based synchronizer of the present disclosure, as long as the converter based synchronizer is able to regulate the active and reactive power flow required for the synchronization.

We found the converter based synchronizer can control the synchronization parameters for synchronization of the generator, by matching of the amplitude, frequency, and phase of the three-phase output voltages of generator with the same synchronization parameters of the power system with which the generator is synchronized. We discovered that the amplitude of the output three-phase voltages can be controlled by regulating the injection of the reactive power flow by the converter based synchronizer. More importantly, among other things, is that the frequency and phase are both controlled by regulating the active power injection by the converter based synchronizer. We recognized it is also important to have an appropriate control architecture and design of the frequency and phase control, so as to avoid conflict between them, as they both are controlled by the same controlling variable, i.e. active power injection. The present disclosure provides systems, in which the coordination problem between the phase and frequency control can be resolved by framing the synchronization problem as a phase-locked loop (PLL) problem.

PLLs can be used to detect phase and frequency of a periodic wave. They find applications in grid-connected converters to detect phase of the grid voltage required for the control of converters. The PLL consist of three components: phase detector, loop filter, and internal oscillator. Phase detector estimates the error between the phases of an external signal and internal oscillator. The output of the phase detector is passed through a loop filter to remove the high frequency components and generate a frequency reference for the oscillator. As the oscillator is implemented by fast analog circuit or digitally in signal processors, the frequency of the oscillator output instantaneously follows the frequency reference from the loop filter. To properly design the PLL, error between the phases of the external signal and the oscillator output should go to zero after a disturbance. Moreover, the frequency of the oscillator coincides with the frequency of the external signal in the steady-state. For generator synchronization using the PLL structure, an additional frequency control mechanism is required for generator to track the frequency reference from the loop filter. Any PLL structure and frequency control mechanism can be used to implement the PLL based generator synchronization.

FIG. 1A is a schematic block diagram of steps of the fast synchronization system, according to some embodiments of the present disclosure. The synchronizer 100 having a controller and at least one processor, wherein the processor provides for steps 110 and 120 and the controller steps 130 and 140.

Step 110 includes the processor continuously obtaining measurement data from a first sensor for a generator of a first grid and a second sensor for a generator of a second grid. Wherein the first generator of the first grid has power flow parameters and the second generator of the second grid has power flow parameters. A breaker is installed at a point of common coupling between the first grid and the second grid. Wherein the breaker in an open position separates the first grid from the second grid, and in a close position connects the first grid with the second grid.

Step 120 includes the processor continually determining power flow parameters for first grid and second grid at sides of the common coupling via the breaker, wherein the power flow parameters for the first and the second grid are indicative of at least a phase and a frequency.

Step 130 includes the controller that synchronizes the phases and the frequencies of the first and the second grid, by continually adjusting an amount of power supplied from a power source, based on continually determining a frequency mismatch and a phase mismatch between the first grid and the second grid, until a first predetermined condition is met.

Step 140 includes the controller verifying when the first predetermined condition met, then moves breaker from an open position to a close position.

FIG. 1B is a schematic illustrating steps of the fast synchronization system of FIG. 1A, along with components of the system, according to some embodiments of the present disclosure. The synchronization system 100 includes a first power grid 101 including a first generator having first power flow parameters and a second power grid 102 including a second generator having second power flow parameters. Wherein step 110 continuously obtains measurement data 106 from sensors 113, 114 by the processor 117.

A breaker 118 installed at a point of common coupling A, B between the first power grid 101 and the second power grid 102. Wherein the breaker 118 in an open position separates the first power grid 101 from the second power grid 102, and in a close position connects the first power grid 101 with the second power grid 102.

Still referring to FIG. 1B, the processor 117 continually determines power flow parameters for first and second power grids 101, 102, at sides A, B of common coupling of the breaker 118 (step 120). Wherein a first sensor 113 is located on a side A of the point of the common coupling for continually determining the power flow parameters of the first power grid 101. A second sensor 114 is located on an other side B of the point of the common coupling for continually determining the power flow parameters of the second power grid 102. Such that the power flow parameters for the first and the second power grids 101, 102 are indicative of at least a frequency and a phase. Also, a power source 116 supplies power to either the first power grid 101 or the second power grid 102.

The controller 119 synchronizes the phases and the frequencies of the first and the second power grid 101, 102, by continually adjusting an amount of power supplied from the power source 116, based on continually determining a frequency mismatch and a phase mismatch between the first grid and the second grid, until a first predetermined condition is met (step 130). Wherein the controller 119 is in communication with sensors 113, 114 and the power source 116. Finally, the controller 119 verifies when the first predetermined condition is met, and then moves the breaker 118 position from the open position to the close position (step 140).

Optionally, the synchronization system 100 can store the continuous measurement data 106 in a computer readable memory 112, wherein the computer readable memory is in communication with the controller 119 and processor 117. Further, it is possible an input interface 111 can be in communication with the memory 112 and the controller 119 and processor 117. For example, a user via a user interface of the input interface 111 may input predetermined conditions, i.e. the first predetermined condition.

Figure 1C:
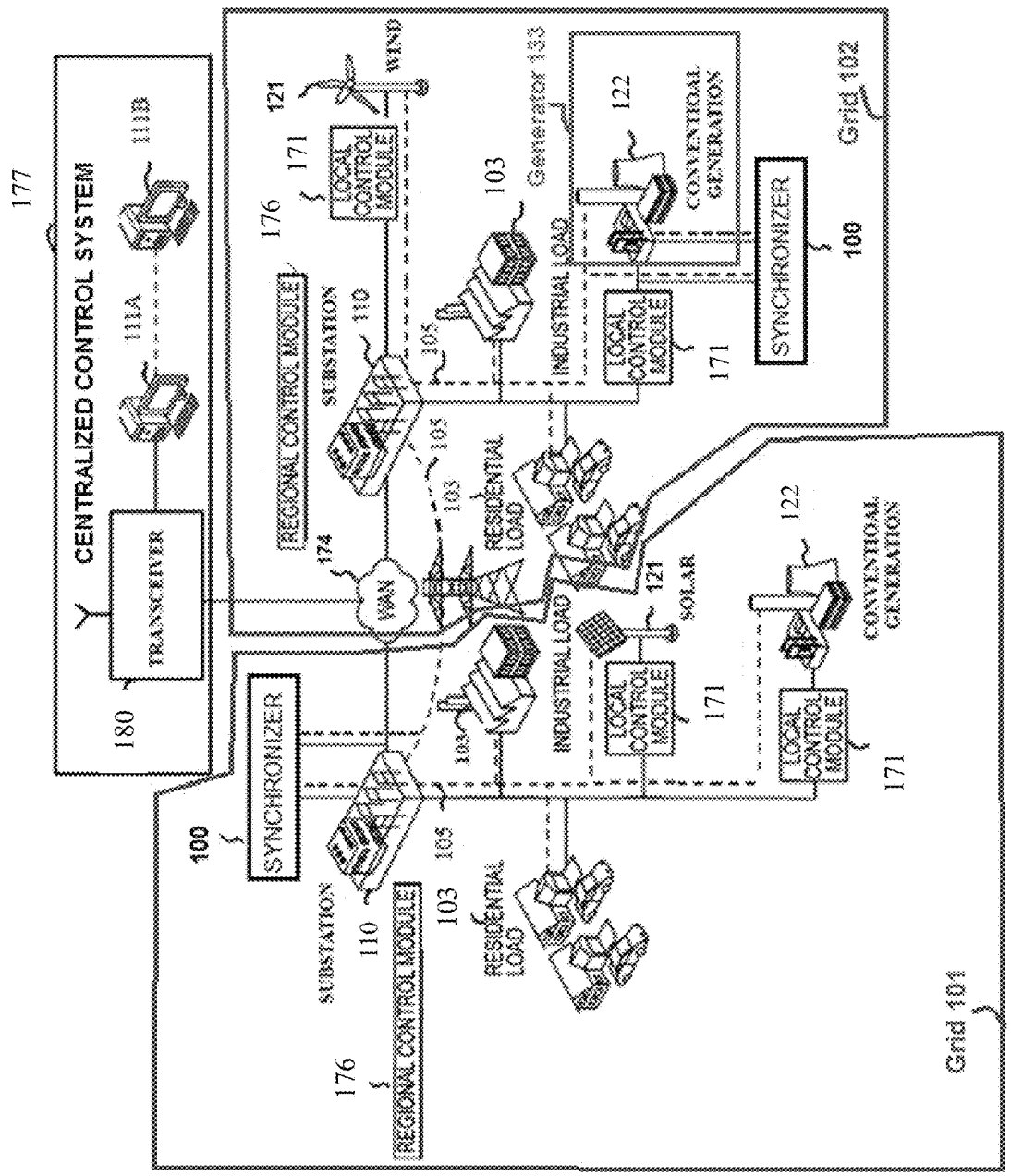
FIG. 1C is a schematic illustrating the fast synchronization system positioned between at least two power grids, or a generator and a power grid, according to some embodiment of the present disclosure.

FIG. 1C shows a schematic of an exemplar power system using converter based synchronizers, according to some embodiment of the present disclosure. The power sources of the exemplar power system include the conventional power generation facilities 122, and the renewable source of the energy 121, such as wind turbine farms and solar arrays. The power consumers of the exemplar power system include the industrial/commercial loads 103 representative of industrial plant or large commercial enterprises, and/or the residential loads 103 representative of residential customers. The power plants, 121 and 122 are coupled with the power consumers, 103 through the substations 110. Associated with substations 110 is a regional control module 176.

The regional control module manages power production, distribution, and consumption within its region. Different regions are interconnected with transmission lines 105 (shown in dashed lines), and the transmission lines can be closed or opened through the circuit breakers located in the substations 110. Each regional control module 176 is communicatively coupled to a centralized control system 177 via, e.g., a wide area network 174. The power plant interfaces with the regional grid via a local control module 171. The local control module 171 can standardize control command responses for generator on/off status change and generation level adjustments issued by regional control module 176 or the centralized control system 177.

Still referring to FIG. 1C, the control system 177 includes a transceiver 180 for exchanging data between the control system and regional control modules 176 via the network 174. Also, control system 177 includes one or several processors 111A and 111B to manage the operation and control of the power system. The control system 177 is operable to manage the interaction of several regional control modules 176 and the power plants under their control. To that end, the centralized control system 177 make decisions for regional grid interconnection or major generator connection to the grid. The regional control module 176 makes the decision for connecting local stand-alone operated generators into its regional grid. For example, the control system 177 can issue a command to the regional control module 176 to connect its controlled regional grid with an adjacent regional grid. The synchronizers described by some embodiments of the disclosure are used to support fast synchronization of two energized grids or a generator with a grid.

Still referring to FIG. 1C, the synchronizer 100 can be installed at a substation 110 for supporting the synchronization of grid 101 with grid 102. It uses the local measurements collected from both sides of the circuit breaker between grid 1 and grid 2 to simultaneously regulate the phase and frequency differences between two grids during the synchronization process. When an interconnection command is issued by the centralized control system, the synchronizer 100 activates the synchronizing process, and close the circuit breaker at the substation 110 when a predetermined threshold is met for differences of power flow parameters between grid 1 and grid 2. The power flow parameters may include frequency, phase angle, voltage amplitude, and phase sequence.

The synchronizer 100 can also be installed at a step-up station of a power plant 122 for connecting a generator 133 of the power plant to the regional grid, grid 102. The power flow parameters at both sides of generator breaker between the generator and the grid are used to regulate the synchronization of the generator 133 with the grid 102. The grid reconfiguration command can be made either by the regional control module 176, or by the centralized control system 177 when there is a need in the power system, such as sudden load changes.

FIG. 1D is a schematic block diagram of step 130 of the fast synchronization system, according to some embodiments of the present disclosure. This disclosure actively regulates active power supplied to the first grid or the second grid based on both frequency mismatch and phase mismatch between the first grid and the second grid. The controller consists at least a phase control compensator, a frequency control compensator, a saturation block and a dq-domain current control of the convertor. The controller synchronizes the phases and the frequencies of the first and the second grid, by iteratively adjusting an amount of power supplied from a power source, until a first predetermined condition is met. For each iterative step, the controller implements the following tasks:

1) Determining a frequency reference through the phase control compensator according to the determined frequency mismatch between the first grid and the second grid;
2) Determining an active power reference through the frequency control compensator according to the determined frequency reference and the determined frequency mismatch between the first grid and the second grid;
3) Limiting the determined active power reference with a predetermined threshold through the saturation block; and
4) Regulating the three-phase currents injected into the first grid or the second grid through the dq-current control of the VSC convertor according to determined power reference.

FIGS. 2A and 2B are schematic block diagrams of the generator synchronization problem using phase-locked loop (PLL) structure 200, FIG. 2A illustrates the general structure of PLL 200, that includes an external signal 210, a phase detector 220 that identifies a phase error 225, a loop filter 230 identifying the frequency reference 235 and an oscillator 240.

FIG. 2B illustrates the modified PLL structure 205 for generator synchronization, according to some embodiments of the present disclosure. Compared with FIG. 2A, a frequency control block 250 providing frequency 250 is added in FIG. 2B. Using the modified PLL structure 205, the simultaneous control of the frequency and phase of the generator 233 can be achieved without any conflict.

Prior Art Methods for Synchronization Using Generator Controls

Figure 3A:
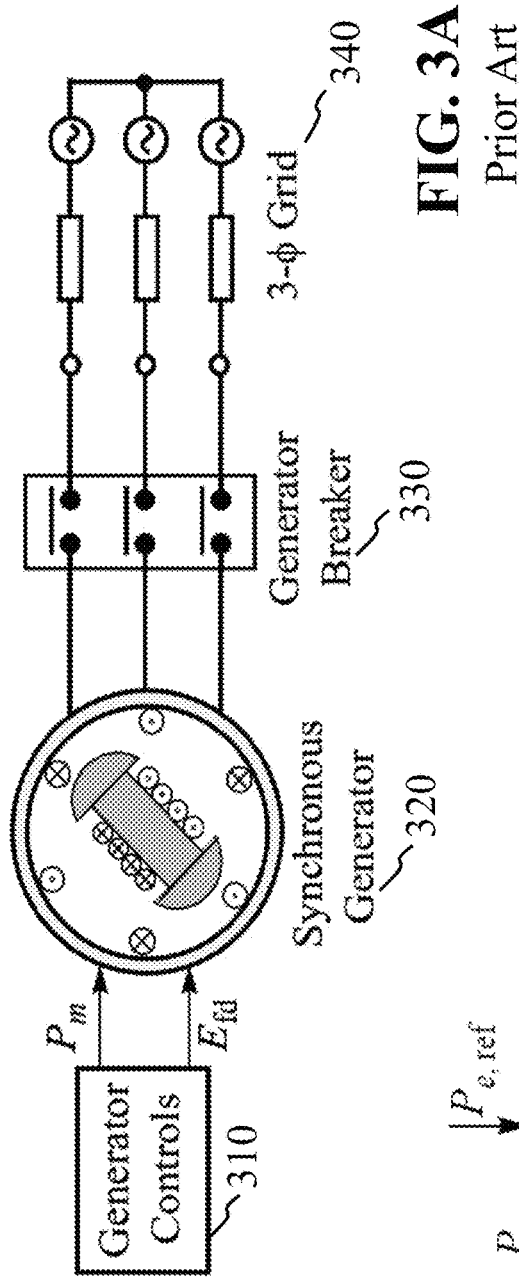
FIGS. 3A, 3B and 3C are prior art schematic block diagrams of synchronization using generator controls: FIG.
Figure 3B:
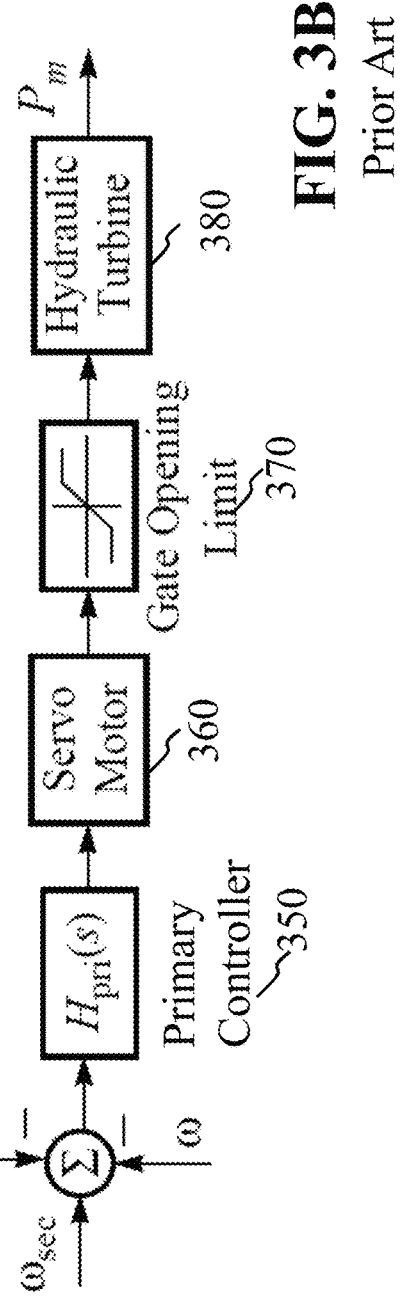
Figure 3C:
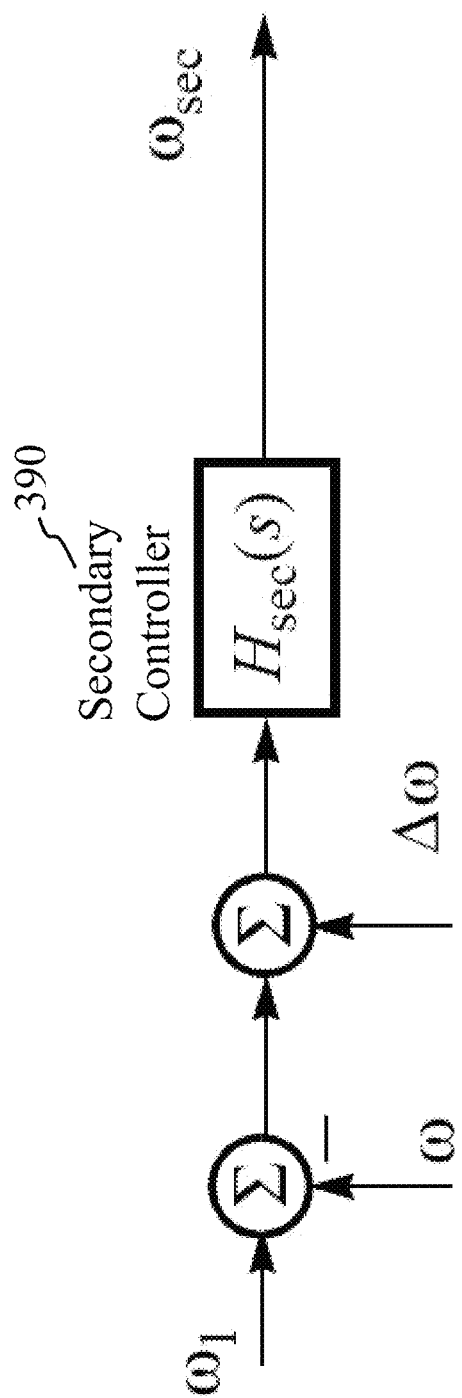

FIGS. 3A, 3B and 3C are prior art schematic block diagrams of the prior art methods for synchronization using generator controls 310. FIG. 3A shows a synchronous generator 320 connected via a generator breaker 330 with a three-phase grid 340. FIG. 3B (prior art) shows a primary control 350 of the generator 320 of FIG. 3A, and a servo motor 360, gate opening limit 370 and a hydraulic turbine 380 is used. FIG. 3C (prior art) is secondary control 390 of the generator 320 of FIG. 3A.

Using the prior art methods, the frequency and amplitude of the generator output voltages are slowly brought to the grid frequency and voltage levels using the primary and secondary control of the generator. For example, when the synchronization process is initiated, the error between the generator and electrical power system frequencies is added to the reference of the generator secondary control. This is indicated by Δω in FIG. 3C (prior art). Based on this error, the primary control modulates the input power $P_m$ in FIG. 3B to the generator to eliminate the frequency error. The voltage amplitude is similarly synchronized by modulating the input voltage to the field windings of the generator, $E_{fd}$. As the phase angle is an uncontrolled variable, the phase synchronization is achieved by a frequency offset between the generator and grid frequencies. Due to the frequency difference, the phase error keeps on changing with time. Once the frequency, phase, and voltage errors come within the stipulated limits, usually referred as the synchronization window, the generator breaker is closed.

Figure 4A:
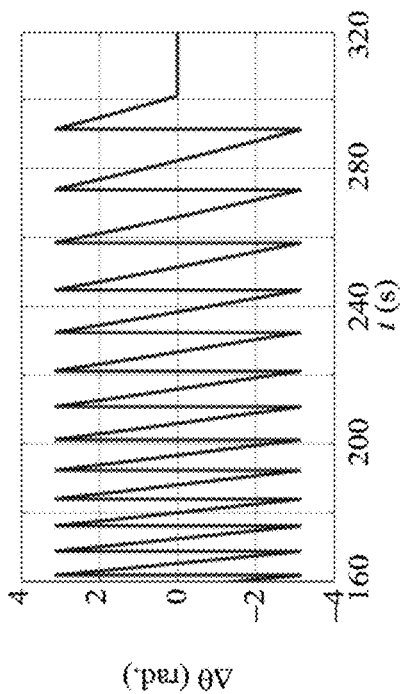
Figure 4B:
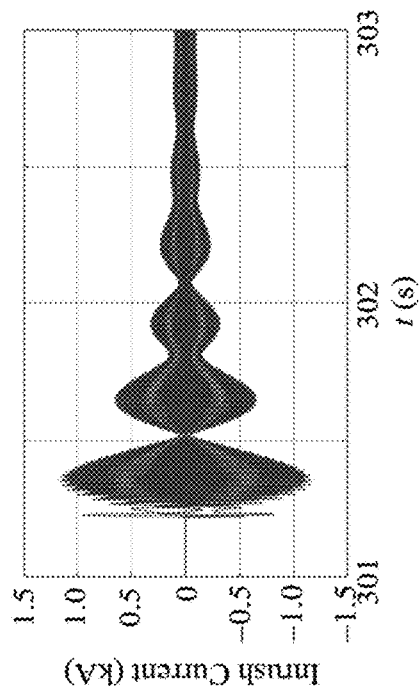
Figure 4C:
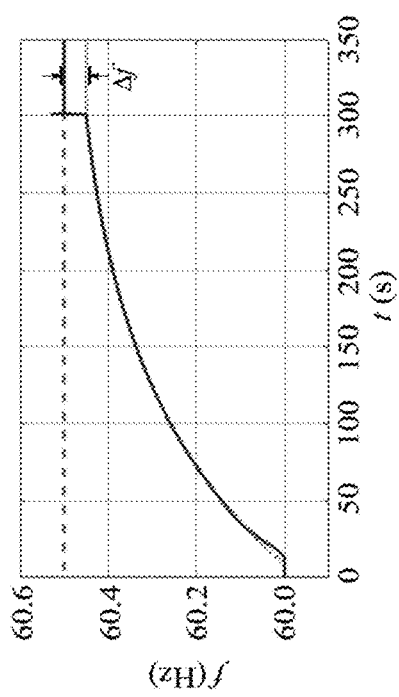

FIGS. 4A, 4B and 4C are exemplar prior-art graphic plots of performance of synchronization using the generator controls of FIG. 3A. FIG. 4A illustrates frequency in Hz (see dashed line that is the grid frequency and the solid line is the generator frequency, and dotted line is frequency reference to primary control, $\frac{\omega_{sec}}{2\pi}$).

FIG. 4B illustrates phase error in radians, and FIG. 4C illustrates inrush currents after the generator breaker is closed.

Specifically, the prior art process is illustrated in FIG. 4A (prior art) by simulating the generator synchronization process for a 550 MW, 24 kV generator. Moreover, due to the frequency difference, the error between the phases of the generator voltage and the main grid voltage, denoted by Δθ, also keeps on changing as shown in FIG. 4B (prior art). When frequency and phase of the three-phase are within stipulated limits, the generator breaker is closed. Frequency and phase error limits considered in the simulated responses in this disclosure are as follows:

$$\Delta f \leq 0.05 \text{ Hz and } \Delta\theta \leq 0.5° \tag{1}$$

FIG. 4C (prior art) shows the inrush current of the exemplar generator after closing of the generator breaker. It is to be noted that the peak inrush current is much lower than the generator peak rating current of 18.67 kA owing to the synchronization process before the breaker operation.

In the simulation of prior art examples presented in FIGS. 4A, 4B and 4C, only the phase and frequency synchronization performance are examined. The amplitudes of the voltages on both sides of the generator breaker are assumed to be the same. In other words, the amplitude synchronization is ignored. This choice is due to following two reasons: 1) matching of the voltage amplitude is comparatively less critical than matching of the frequency and phase of voltage on both sides of the breaker for a smooth synchronization process, and 2) voltage control by regulating the reactive power flow is straightforward, and it does not interfere with the frequency phase synchronization control. Similarly, this disclosure also ignores the synchronization of voltage amplitude.

Because of the slow bandwidth of the secondary control (for example, the time constant is around 120 seconds), the synchronization process takes a considerate time to be completed, such as around 300 seconds in FIGS. 4A and 4B. Moreover, the time for synchronization is highly variable and dependent on the initial frequency difference, and the selected frequency and phase angle offset.

Converter Based Synchronizer

The prior art synchronization methods rely on the generator controls and the phase synchronization is achieved in a passive manner. However, this results in slow synchronization and long interconnection time. It may also lead also to a faulty synchronization, as a zero phase error cannot be ensured during the generator breaker operation.

To address these problems of the prior art of FIGS. 3A-4C noted above, the present disclosure formulated the generator synchronization problem as an oscillator synchronization problem, and a PLL based synchronization method is used. The PLL based synchronization of generators is realized using a two-level voltage source convertor (VSC) based synchronizer.

The synchronizer utilizes a first and a second sensors that both are of phase-locked loop type sensor to receive three phase voltages when connected the first grid and the second grid, so as to determine power flow parameters, wherein the power flow parameters are from the group consisting of a frequency, a phase angle, a voltage magnitude and a phase sequence.

The two-level voltage source converter is connected to a DC voltage source, and served as a power source to the first grid or second grid, such that the converter injects or extracts three-phase currents to the connected first grid or the second grid. The three-phase currents are continually adjusted by a dq-domain current control of the controller of the convertor, based on the continually adjusted amount of power determined by the controller, and wherein a bandwidth of the dq-domain current control is set lower than a switching frequency of the converter.

The controller includes a phase-control compensator, a frequency-control compensator and a saturation block, wherein a bandwidth of the frequency-control compensator is set lower than the bandwidth of the dq-domain current control, and wherein a bandwidth of the phase-control compensator is set lower than the bandwidth of the frequency-control compensator. The phase-control compensator uses a phase mismatch to determine a frequency reference for the frequency-control compensator, such that the phase mismatch is determined as a difference of phase angles between the first and the second grids, and wherein the phase control is activated only after the frequency mismatch met the first predetermined condition, such that the frequency mismatch is determined as a difference of a frequency between the first and the second grids.

The frequency-control compensator determines the continually adjusted amount of power supplied from the converter, based on the determined frequency reference from the phase-control compensator and the frequency mismatch between the first and the second grids, and wherein the frequency-control compensator includes an anti-windup scheme that is implemented within the frequency control compensator to increase a control stability of the controller. The saturation block limits an output of the frequency-control compensator with a saturation limit, such that the saturation limit is set by a power rating of the converter.

The power rating of the converter is determined, based on a time reaching synchronization between the first and the second grids, such that the synchronization time is a sum of a frequency locking time and a phase locking time, in which the frequency locking time is determined based on a ratio of an exchange energy between the first and the second grids and the power rating of the convertor, such that the exchange energy is determined based on an initial frequency difference between the first and the second grids and a mechanical inertia of either the first grid or the second grid, connected to the converter, and wherein the phase locking time is determined according to the bandwidth of the phase-control compensator, and the bandwidth of the phase-control compensator is determined based on an inertia constant of either the first grid or the second grid, connected to the convertor and the power rating of the converter.

Figure 5A:
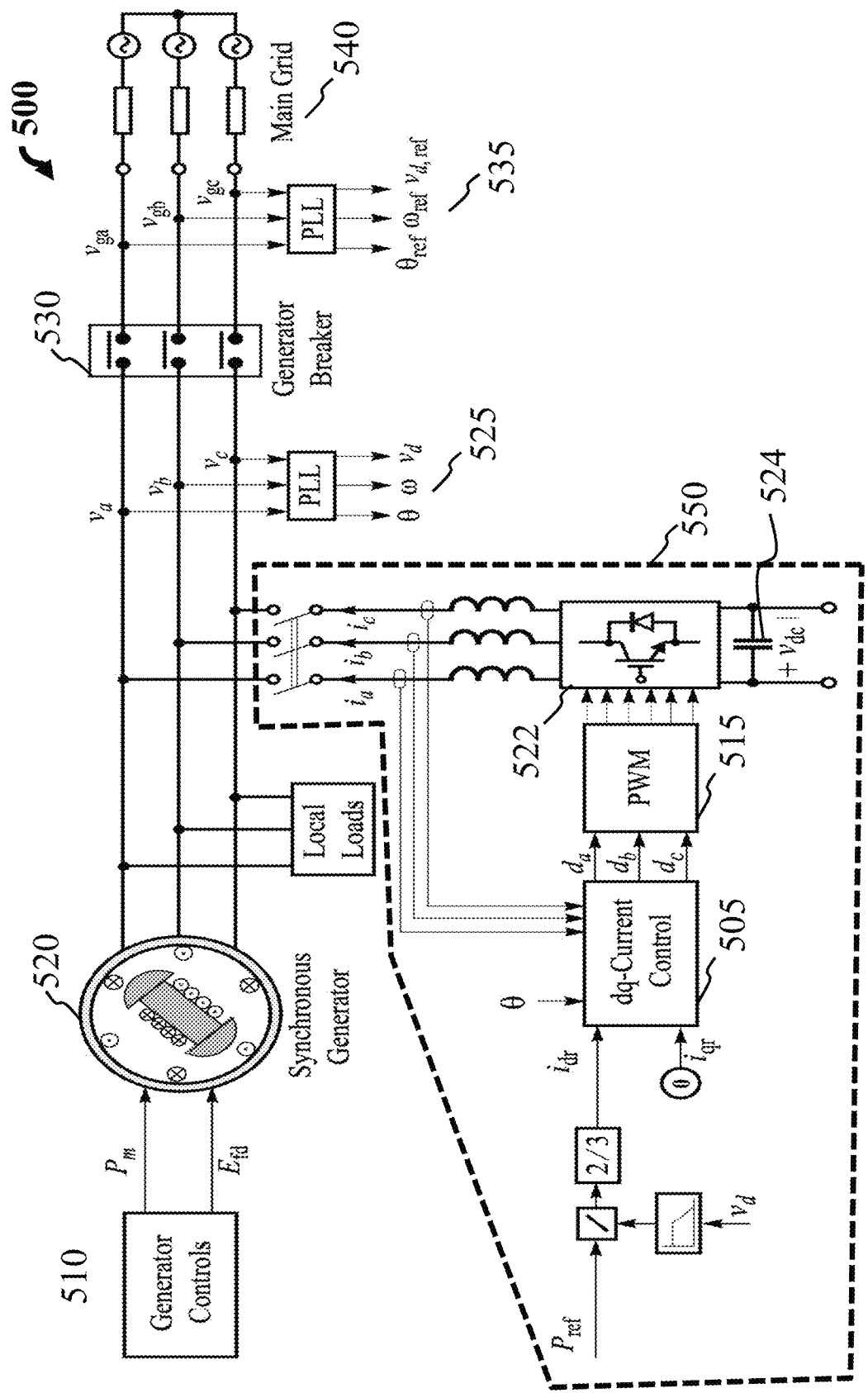
FIG. 5A is a schematic illustrating the system for fast synchronization of a generator, i.e. a synchronous generator with a power grid using a power electronic interface, in particular, a VSC-based synchronizer, according to some embodiments of the present disclosure.

FIGS. 5A, 5B, 5C and 5D illustrate embodiments of the present disclosure for the converter based synchronizer. FIG. 5A is a schematic illustrating the fast synchronization system 500 of a synchronous generator 520 with generator controls 510 using a power electronic interface, in particular, a VSC-based synchronizer 550, according to some embodiments of the present disclosure. For example, two-level voltage source converter (VSC) 522 topology is used for the converter. The converter 522 is supplied by an ideal dc voltage source 524 of magnitude $v_{dc}$. The dc side can be supplied by any dc source, such as batteries or fuel cells. It can also be realized by a power converter interfacing with the main grid.

Figure 5B:
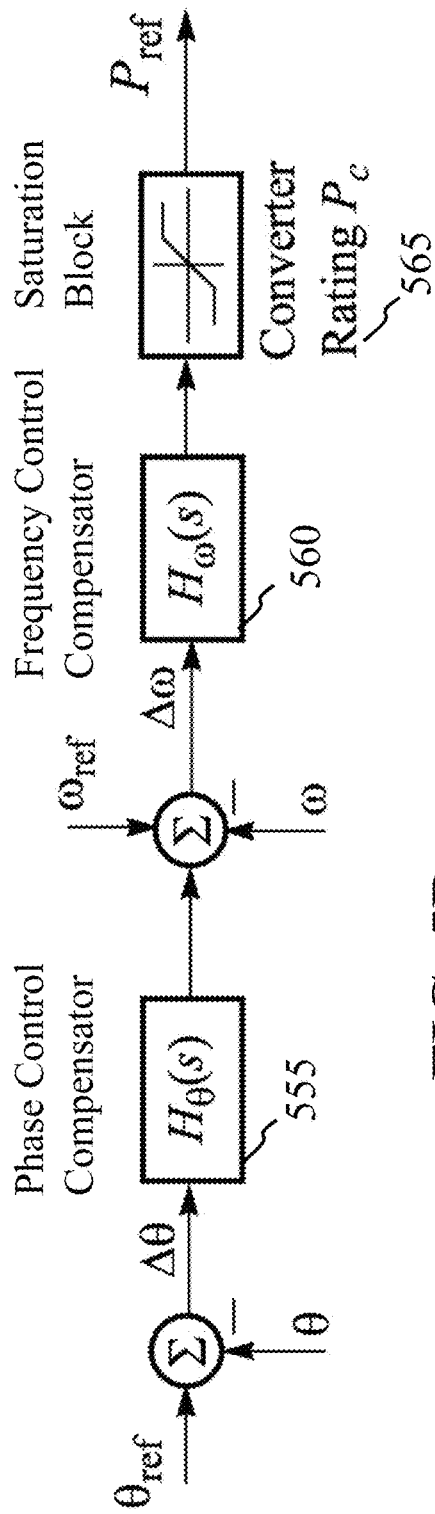
FIG. 5B is a schematic illustrating frequency and phase synchronization control, according to some embodiments of the present disclosure.

The VSC-based synchronizer 550 receives the frequency, phase and d-axis voltage from two Phase-Locked Loop (PLL) type sensors, 525 and 535 installed at both sides of the point of common coupling, 530 between the generator 520 and the main grid 540. The synchronizer is installed at the generator side in FIG. 5A, and injected three-phase currents, $i_a$, $i_b$ and $i_c$ into the grid connected with the generator according to the active power reference, $P_{ref}$ that determined based on the phase and frequency difference between the generator and the main grid as illustrated in FIG. 5B. Using this reference power $P_{ref}$ and d-axis voltage $v_d$ given by the PLL 525, a set of reference currents in dq-domain, $i_{dr}$ and $i_{qr}$ is determined and sent to a dq-current control block 505 to generate a set of modulation signals for the Pulse-width modulation (PWM) block, 515. When ignoring the amplitude synchronization, the q-axis reference current $i_{qr}$ zero. Based on the determined modulation signals, the PWM 515 is generating a set of impulse signals for the convertor to regulating its output currents, $i_a$, $i_b$ and $i_c$ to the connected grid FIG. 5B shows the present disclosure disclosed synchronization control based of the concept described in FIG. 2B. Frequency and phase are both controlled by regulating the active power output from the VSC. Function of the phase detector is implemented by the two PLL described above, giving phase error $\Delta\theta$:

$$\Delta\theta = \theta_{ref} - \theta \qquad (2)$$

where $\theta_{ref}$ is the phase angle of the main grid 540 voltages, and $\theta$ is the phase of the generator 520 output voltages. The phase error $\Delta\theta$ is passed through phase control compensator $H_\theta(s)$ 555, which plays the role of the loop filter 230 of FIG. 2B.

As shown in FIG. 5B, $H_\theta(s)$ 555 gives frequency reference for the oscillator, which in this case is generator or microgrid that need to be synchronized. To eliminate the initial transients, the frequency $\omega_{ref}$ of main grid 540 is added to the output of the phase control compensator 555. In one of the embodiment of the present disclosure, phase control is activated only after the frequency of the generator is matched with $\omega_{ref}$ within a stipulated tolerance.

Frequency reference generated by the sum of the output of $H_\theta(s)$ 555 and $\omega_{ref}$ is then compared with the frequency of the generator as measured at the point of interconnection by a PLL 525. Based on the frequency error, frequency control compensator $H_\theta(s)$ 560 generates reference of the active power $P_{ref}$ to be injected by the converter. Saturation block 565 at the output of $H_\theta(s)$ with the saturation limit of $P_c$ represents the converter power rating. Control stability is increased by implementing an anti-windup scheme in $H_\theta(s)$ 560.

Figure 5C:
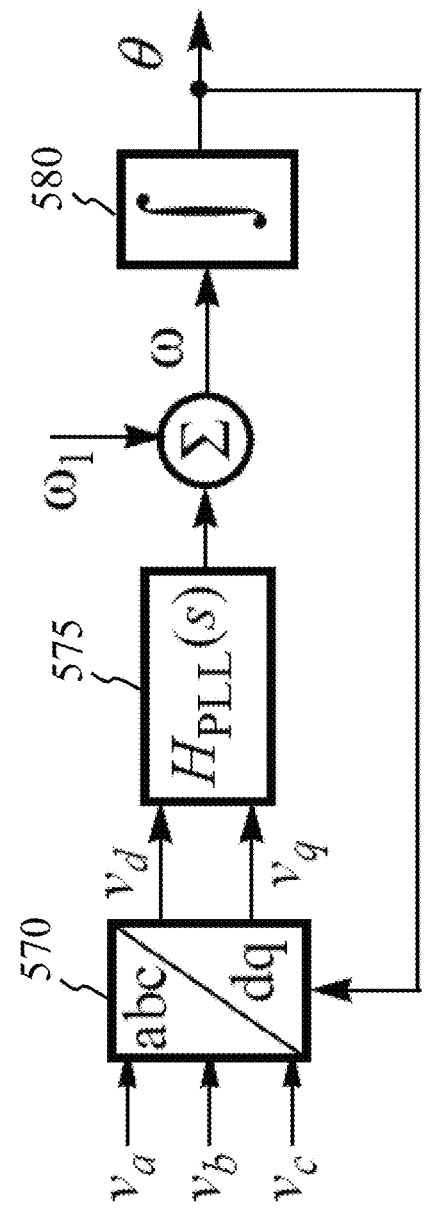
FIG. 5C is a schematic illustrating a phase-locked loop (PLL) for detecting phase and frequency difference between two grids, according to some embodiments of the present disclosure.

FIG. 5C is a schematic illustrating a phase-locked loop (PLL) for detecting phase and frequency difference between the generator and the main grid, according to some embodiments of the present disclosure. Synchronous reference frame (SRF) based three-phase PLL is used for obtaining the phase angle, frequency, and amplitude of three-phase voltages. Two PLLs, 525 and 535 as shown in FIG. 5A are used, each for the generator and the main grid. Both PLLs are designed with a predetermined bandwidth, such as 30 Hz. The measured three-phase voltages in abc domain, $v_a$, $v_b$ and $v_c$ are first converted into values in d-q domain, $v_d$ and $v_q$ through a abc-to-dq transformation 570, then are passed through a PLL block 575 to generate a frequency reference. The frequency of the grid that the PLL is connected to is then determined as a combination of the determined frequency reference from PLL block 535 and a synchronous frequency $\omega_1$. The frequency is passed through an integration block 580, then the phase $\theta$ of the connected grid is determined.

Figure 5D:
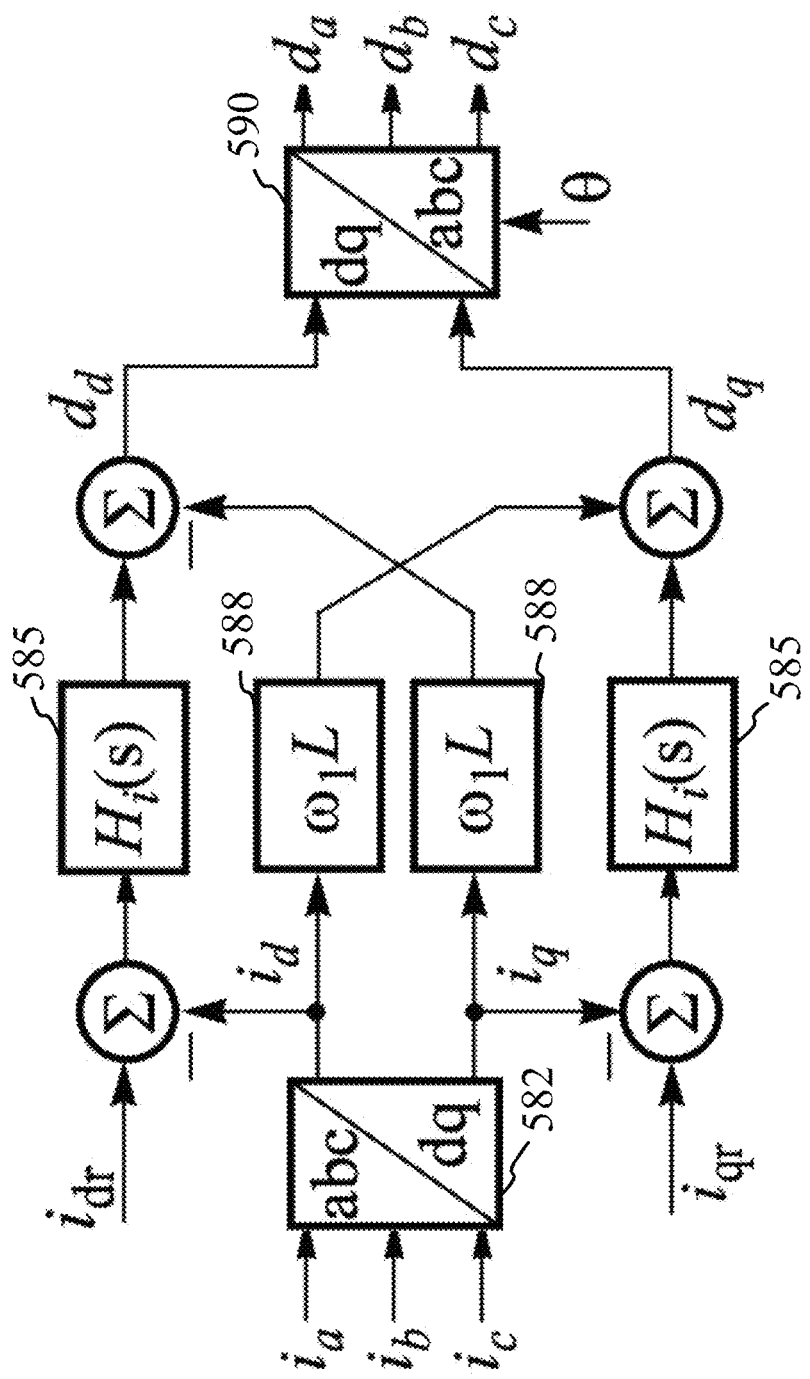
FIG. 5D illustrates a VSC ac current control in dq domain, according to some embodiments of the present disclosure.

FIG. 5D illustrates a VSC ac current control in dq-domain, according to some embodiments of the present disclosure. Active power is regulated at reference $P_{ref}$ by controlling the output current from the VSC using dq-domain current control. The measured three-phase currents in abc domain, $i_a$, $i_b$ and $i_c$ are first converted into values in d-q domain, $i_d$ and $i_q$ through a abc-to-dq transformation 582, then along with the current references in dq-domain, $i_{dr}$ and $i_{qr}$ are passed through a current control compensator 588 and reactance circuit 588 to generate modulation signals in dq-domain, $d_d$ and $d_q$. The dq-frame modulation signals, $d_d$ and $d_q$ are then further converted into abc-domain, $d_a$, $d_b d_d$ and $d_c$ through a dq-to-abc transformation 590, and sent to the Pulse-width modulation (PWM) block, 515 of FIG. 5A for controlling the output currents of the convertor.

In one of the embodiment, generator controls are disabled after the synchronization process is initiated to avoid conflict between the generator controls and the converter based synchronizer. This is equivalent to freezing the mechanical power input to generator $P_m$ and field voltage $E_{fd}$ in FIG. 5A, once the synchronization process is initiated.

Figure 6A:
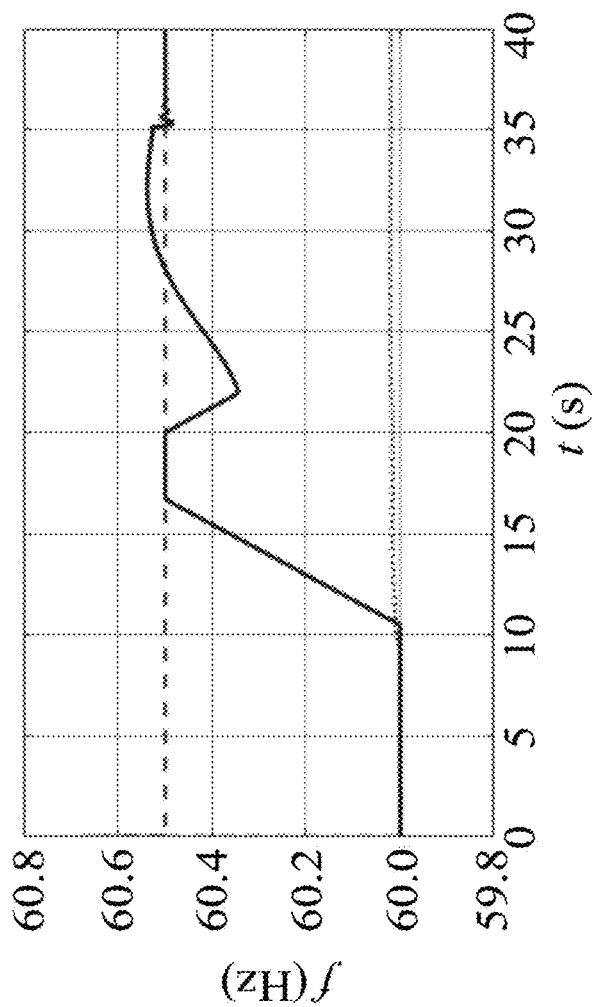
FIG. 6A is an exemplar graphic plot illustrating synchronization using VSC-based synchronizer, in particular, the frequency in Hz, wherein the dashed line is grid frequency and solid line is generator frequency, according to some embodiments of the present disclosure; Generator controls are disabled during synchronization, according to some embodiments of the present disclosure.

FIGS. 6A, 6B, 6C and 6D are exemplar graphic plots illustrating synchronization using VSC-based synchronizer, wherein the generator controls are disabled during synchronization. FIG. 6A gives the frequency in Hz during the synchronization process, wherein the dashed line is grid frequency and solid line is generator frequency. As shown in FIG. 6A, the synchronization process is initiated at 10 seconds, which results in frequency locking at around 17 seconds due to power supplied by the synchronizer.

Figure 6B:
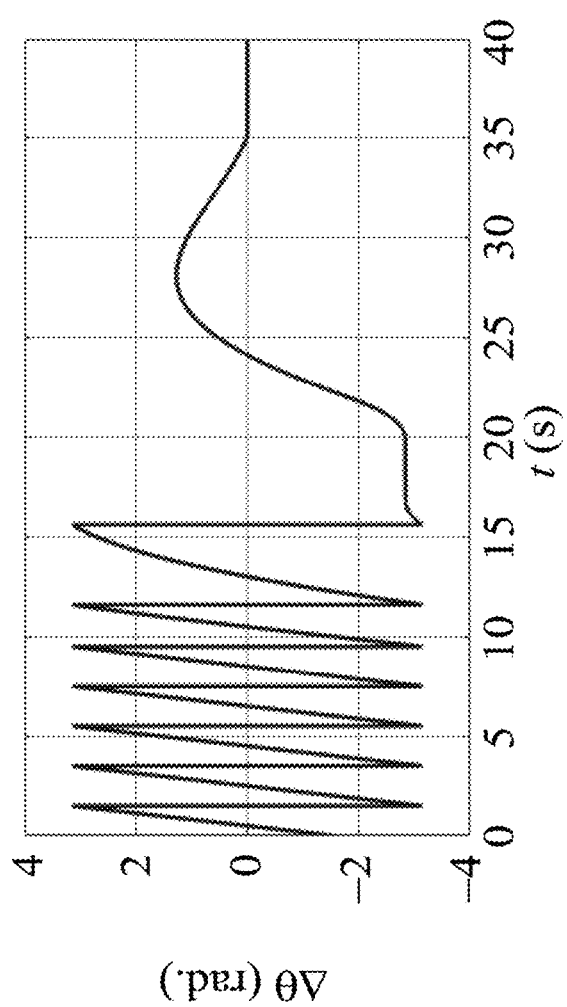
FIG. 6B is an exemplar graphic plot illustrating phase error in radians, according to some embodiments of the present disclosure.

FIG. 6B shows the phase error in radians during the synchronization process using VSC based synchronizer in radians. To clearly demonstrate operation of the frequency and phase control, phase control is initiated at 20 seconds, which reduces both frequency and phase errors below the offsets defined in (1). Hence, synchronization is achieved in 25 seconds.

Compared with the results with ones in FIGS. 3A and 3B, the VSC based synchronizer can reduce the synchronization time by an order of magnitude. Moreover, the VSC based synchronizer relies only on the local measurements at the point of common coupling and also ensures zero phase error during the breaker operation.

Figure 6C:
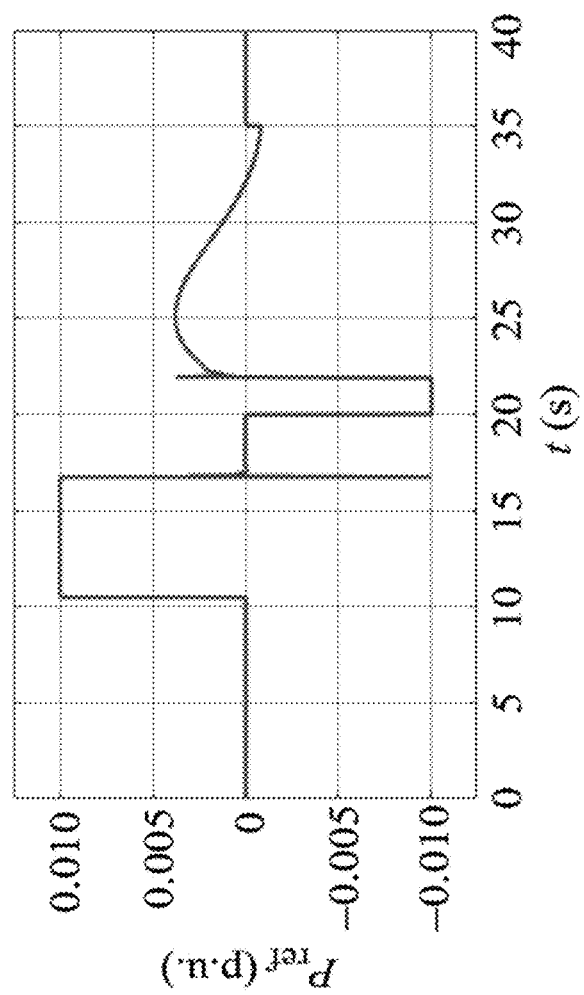
FIG. 6C is an exemplar graphic plot illustrating VSC power output during synchronization, according to some embodiments of the present disclosure.
Figure 6D:
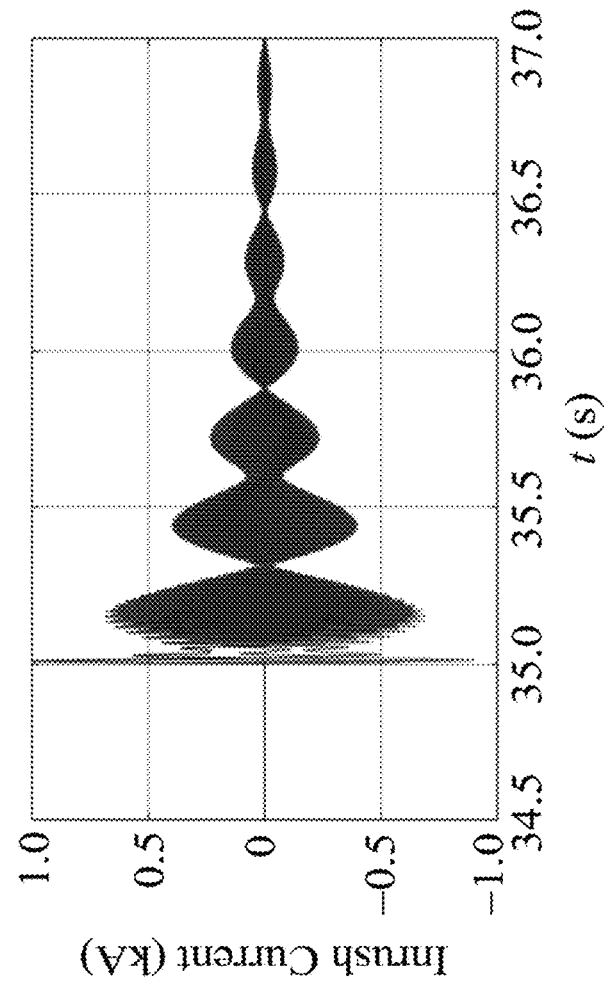
FIG. 6D is an exemplar graphic plot illustrating inrush currents during synchronization.

FIG. 6C shows the power output from the VSC in per unit during the synchronization process. It shows that the peak VSC output is just one percent of the generator rating. FIG. 6D shows the inrush currents during the synchronization process. The inrush currents are much smaller than those in FIG. 3C due to the active synchronization control achieved by the VSC based synchronizer. They can be reduced further by reducing the size of the synchronizing window, defined in Eq. (1), without significantly increasing the synchronization time.

Figure 7A:
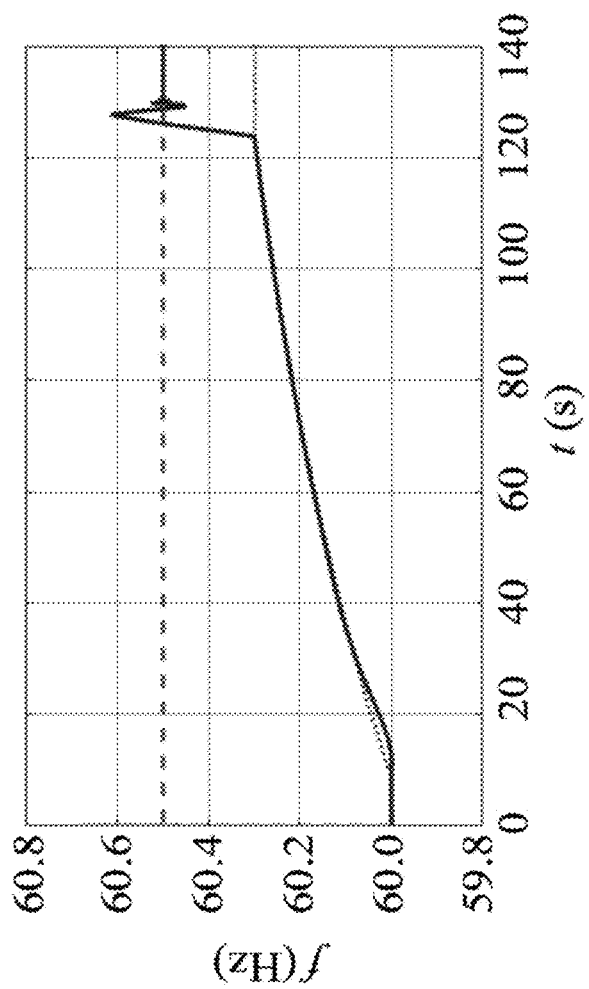
FIGS. 7A and 7B are exemplar graphic plots illustrating synchronization using VSC-based synchronizer in presence of generator controls.
Figure 7B:
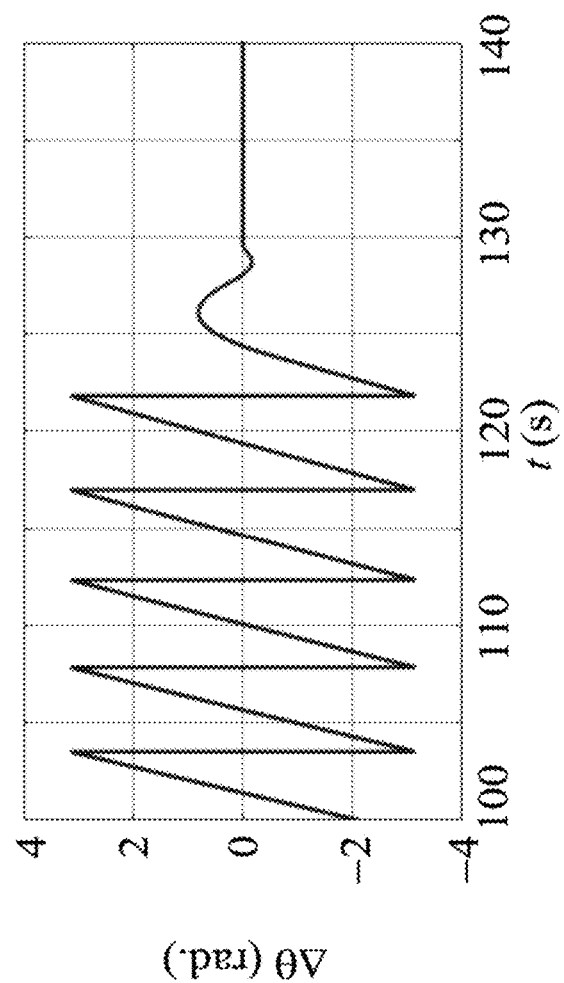

FIGS. 7A and 7B illustrates performance of the disclosed synchronizer when generator controls are not disabled and are allowed to operate during the synchronization process, according to embodiments of the present disclosure. FIG. 7A shows the frequency in Hz, such that the dashed line is grid frequency and solid line is generator frequency.

FIG. 7B shows phase error in radians, wherein the VSC-based synchronizer is activated when the frequency error is less than a predetermined threshold, such as 0.2 Hz. This example demonstrates the situation where generators are located far from the point of interconnection and synchronizer, and it is not desirable to temporarily disable generator controls. Under such condition, the action of the synchronizer will be nullified by the generator controls. For example, when the synchronizer tries to quickly increase the generator frequency by injecting power at the point of common coupling, the generator controls will try to maintain the frequency by reducing the input power $P_m$ to the generator. Hence, after initial buildup in the frequency by the synchronizer, its effect is nullified. However, the difference between the speeds of the VSC-based synchronizer and generator control can still be leveraged to reduce the synchronization time.

As shown in FIGS. 7A and 7B, the generator controls are initially allowed to execute the synchronization. When the frequency error is low enough, the VSC based synchronizer is activated to quickly synchronize the frequency and phase. If the converter based synchronizer is activated when the frequency error is too high, the generator controls will start acting before the synchronization is complete and will nullify the effect of the synchronizer. Higher rating of the converter based synchronizer permits higher frequency error at which the synchronizer can be activated.

Under both scenarios, synchronization in presence or absence of generator controls, the rating of the converter based synchronizer influences the speed of the synchronization process. The relation of the converter based synchronizer rating and the speed of synchronization process is presented in the next section along with the design constraints for the frequency and phase control compensators.

Control Design, Sizing of Converter Based Synchronizer, and Performance

Frequency Control Compensator Design

Bandwidth of the dq current control in FIG. 5A is limited by the converter switching frequency. In the example presented in this section, converter switching frequency is kept be 2 kHz and the current control compensator $H_i(s)$ is designed to give bandwidth of 200 Hz.

For the design of frequency control compensator $H_\omega(s)$, we need to obtain the frequency control loop gain:

$$L_\omega(s) = H_\omega(s) \cdot \frac{\Omega(s)}{P_{ref}(s)} \qquad (3)$$

where the second term on the right hand side represent transfer function from the active power reference $P_{ref}$ to the frequency in rad/s at the point of interconnection. In our example, this frequency is same as the generator speed $\omega$ at no impedance is considered between the generator and the point of interconnection in presented example. Moreover, as bandwidth of the frequency control is designed much lower than the current control bandwidth, the active power injected by the converter based synchronizer can be considered to be equal to its reference, $P_{ref}$.

Eq. (4) approximately describes the dynamics of the generator frequency (speed), $$\frac{d\omega}{dt} = \frac{1}{2H}(P_m - P_e - K_d \Delta\omega) \qquad (4)$$

where $P_m$ is the mechanical power input to the generator in p.u., $P_e$ is the electrical power output of the generator in p.u., $K_d$ is the damping constant, H is the inertia constant in seconds, and $\Delta\omega$ is the speed deviation from the nominal speed in p.u. In the examples presented here, $K_d$ is assumed zero.

Injection of power by the converter based synchronizer is equivalent to reducing $P_e$ by the same amount. Hence, $$\frac{\Omega(s)}{P_{ref}(s)} = -\frac{\Omega(s)}{P_e(s)} \quad (5)$$

Due to the generator controls, $P_m$ will react to any change in the speed $\omega$. Hence, transfer function in (5) include effects of generator controls through variation in $P_m$ in (4). If generator controls are disabled after initiating the synchronization process, $P_m$ remains constant and the transfer function in (5) simplifies to:

$$\frac{\Omega(s)}{P_{ref}(s)} = \frac{1}{2Hs} \quad (6)$$

With this frequency control loop gain in (3) becomes $$L_\omega(s) = H_\omega(s) \cdot \frac{1}{2Hs} \quad (7)$$

Figure 8A:
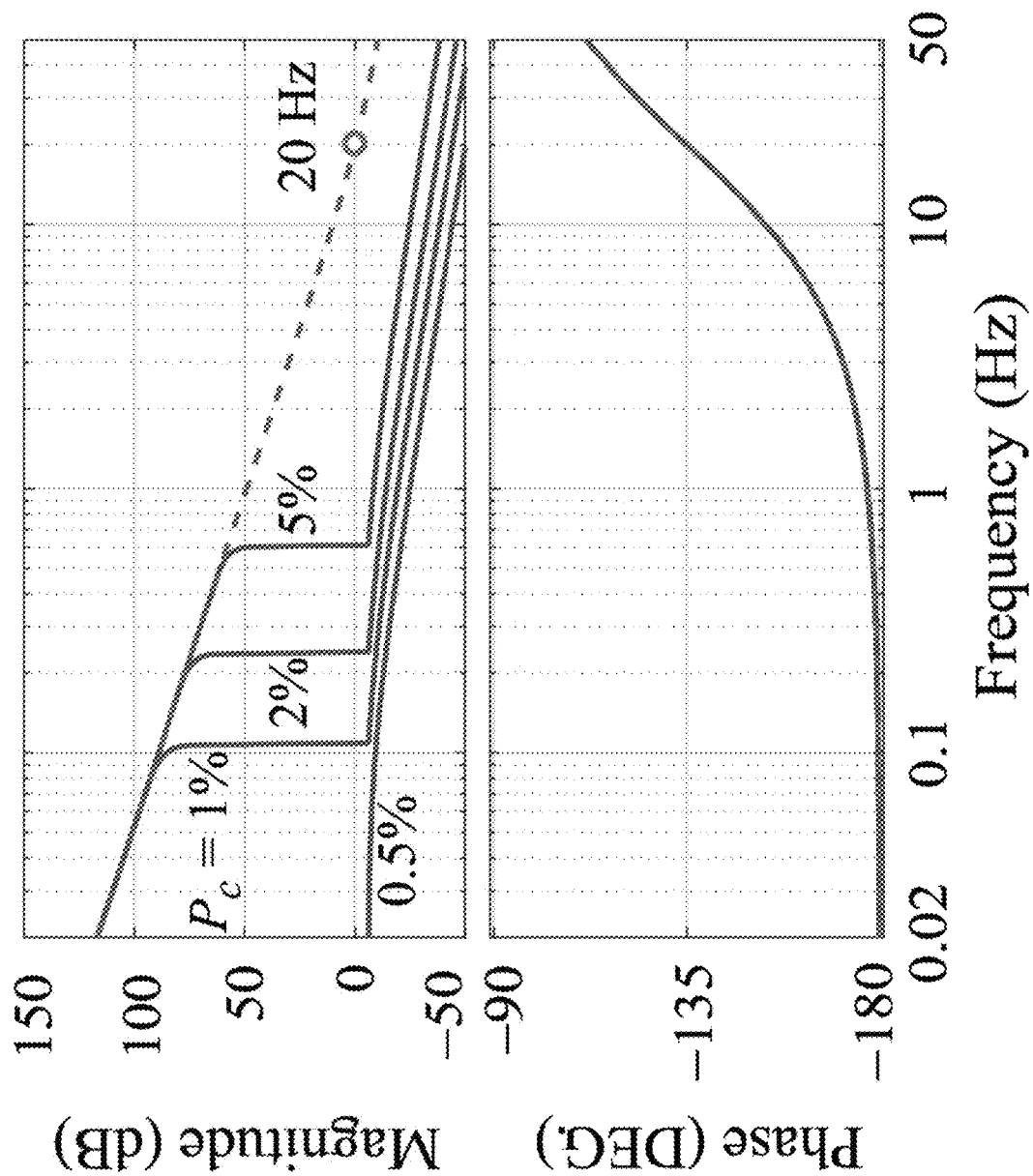
FIGS. 8A and 8B are exemplar graphic plots of the frequency response.

Frequency control compensator is designed to give bandwidth of 20 Hz. Frequency domain response of frequency control loop gains, $L_\omega(s)$ is shown in FIG. 8A. Dashed lines show response when the effect of a finite converter rating are not considered in the loop gain model. Designed bandwidth can be confirmed by noting that the loop gain is 0 dB at 20 Hz.

Phase Control Compensator Design

As phase control is the outer loop, as shown in FIG. 5B, the frequency control dynamics can be neglected if the phase control bandwidth is kept much lower than the frequency control bandwidth. Under this condition, the phase control loop gain is given by $$L_\theta(s) = H_\theta(s) \cdot \frac{60}{s} \quad (8)$$

where $H_\theta(s)$ is the phase control compensator, integrator represents conversion of the frequency output from the inner loop to the phase angle, and factor 60 converts the output of the inner frequency control from p.u. to the absolute value.

Figure 8B:
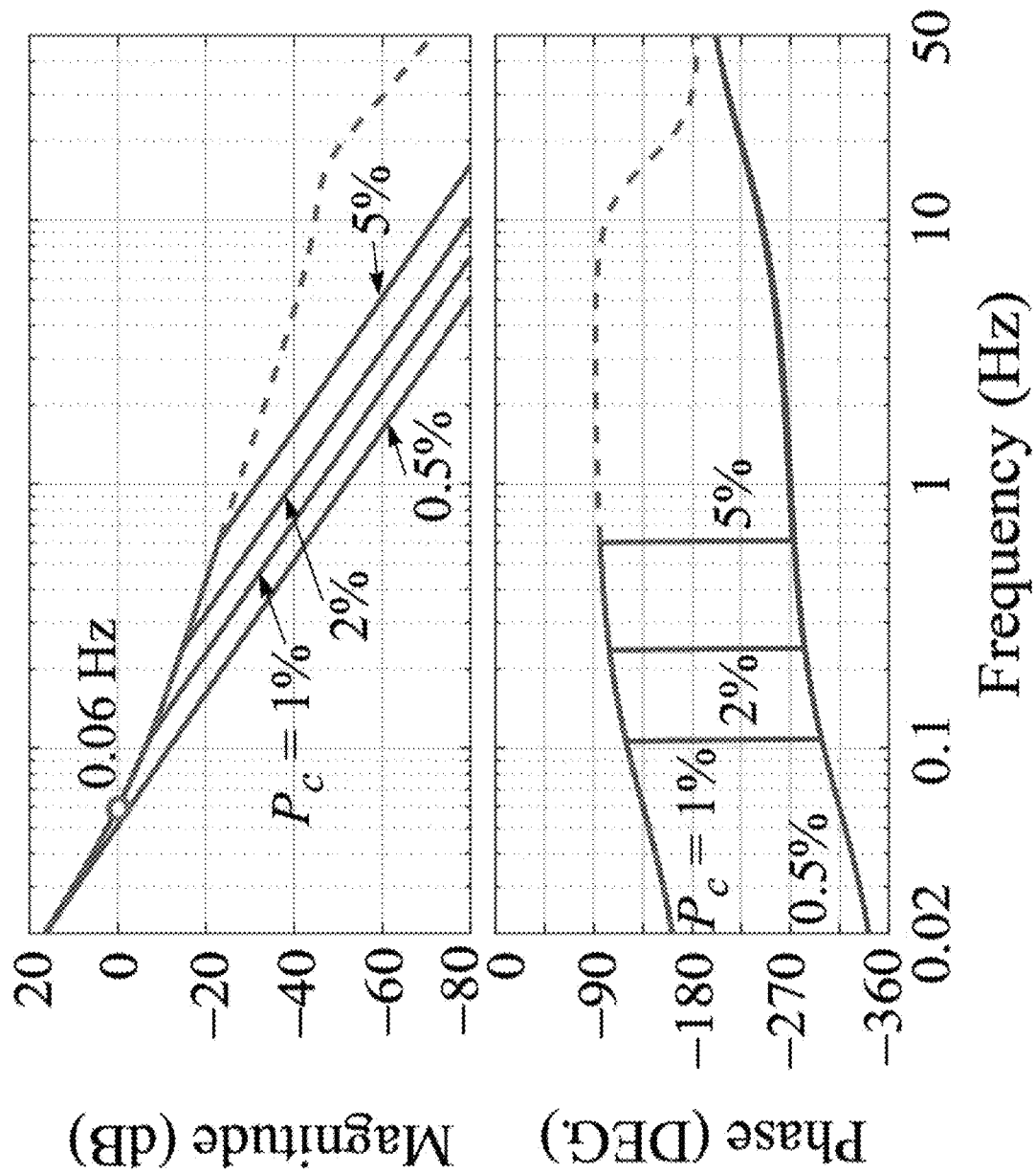

FIG. 8B shows the frequency domain response of phase control loop gains. Wherein solid lines show responses for different VSC-based synchronizer ratings, represented as the percentage of the generator rating, and dashed lines show response for the ideal synchronizer (infinite rating).

Figure 9:
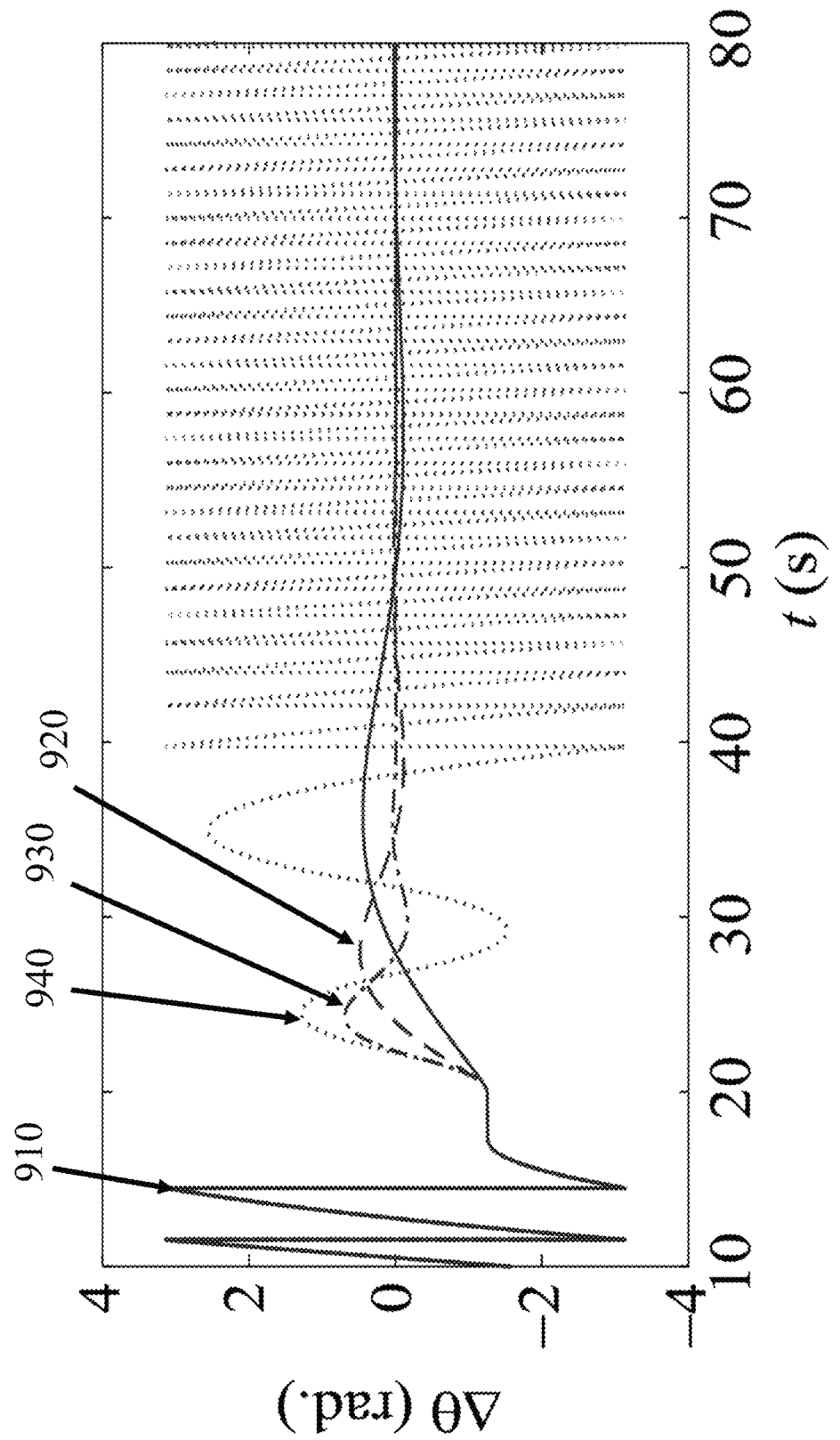
FIG. 9 is an exemplar graphic plot of phase error response for different phase control bandwidths demonstrating limitation on bandwidth imposed by the synchronizer rating, wherein the bandwidth is shown as: 0.03 Hz (solid lines), 0.06 Hz (dashed lines), 0.12 Hz (dashed-dotted lines), and 0.15 Hz (dotted lines), according to some embodiments of the present disclosure.

FIG. 9 shows the phase error response for different phase control bandwidths demonstrating limitation on bandwidth imposed by the synchronizer rating, wherein the bandwidth is shown as: 0.03 Hz (solid lines) 910, 0.06 Hz (dashed lines) 920, 0.12 Hz (dashed-dotted lines) 930, and 0.15 Hz (dotted lines) 940.

With inner frequency control bandwidth of 20 Hz, phase control bandwidth can be easily designed to be around 2 Hz. However, FIG. 9 shows that the phase control becomes unstable for bandwidths above 0.12 Hz. This is due to the limited rating of the converter based synchronizer. Relationship between the converter rating, control stability, and synchronization performance are discussed in the next subsection.

Synchronizer Rating: Effects and Control Design

Cost considerations required converter based synchronizer rating to be as small as possible. It is important to quantitatively evaluate relationship between the converter rating, control design and stability, and performance of synchronization process.

Control design in the previous two subsections did not consider the effects of limited rating of the converter based synchronizer. Limited rating of the synchronizer, denoted by $P_c$, manifests as a saturation in the reference $P_{ref}$ as shown in FIG. 5B. To avoid instability of the frequency control loop due to the saturation block (i.e. limited power rating), anti-windup scheme is implemented in the frequency control compensator $H_\omega(s)$. The anti-windup scheme clamps the output of $H_\omega(s)$ to $P_c$ and also stops integrating the input, whenever the output goes beyond the limit $P_c$.

For the frequency domain design, the saturation block in FIG. 5B is represented by its describing function, which is the gain of the saturation block considering its dependence on the amplitude of the input signal. Describing function gain $N(A)$ of the saturation block in FIG. 5B is given by $$N(A) = \begin{cases} 1 & \text{for } A \le P_c \\ \frac{2}{\pi}\left[\operatorname{asin}\left(\frac{P_c}{A}\right) + \frac{P_c}{A}\sqrt{1-\left(\frac{P_c}{A}\right)^2}\right] & \text{for } A > P_c \end{cases} \quad (9)$$

where A is the amplitude of the input signal to the saturation block. It is evident from (9) that the gain of the saturation block is unity when the input signal amplitude is below the synchronizer rating Pc. Moreover, the gain keeps on decreasing as the input signal amplitude A keeps on increasing beyond Pc. This results in the reduction in the frequency control bandwidth. Consequently, this requires reduction in the phase control bandwidth to avoid conflict between the frequency and phase control.

Even after knowing the gain of the saturation block due to the limited synchronizer rating, it is not possible to directly obtain the frequency domain response of the frequency and phase control loop gains. This is because the amplitude A is unknown. However, we can determine the worst case amplitude A, which is same as the maximum possible A. We know the worst case error in the phase angle is $\pi$. Hence maximum value of the input to the phase control compensator $H_\theta(s)$ is $\pi$. Hence, A can be determined for the worst case scenario by solving the following nonlinear equation:

$$\frac{A}{\pi} = \left|\frac{H_\theta(s) \cdot H_\omega(s)}{1 + H_\theta(s) \cdot N(A) \cdot \frac{\Omega(s)}{P_{ref}(s)}}\right| \quad (10)$$

It is to be noted that the worst case value of A is dependent on the frequency. Moreover, if generator controls are disabled during synchronization, then $$\frac{\Omega(s)}{P_{ref}(s)} = \frac{1}{2Hs} \quad (11)$$

Solving (10) for each frequency for A and using (9), we can obtain the frequency response of the frequency and phase control loop gains for different ratings of the converter based synchronizer.

Solid lines in FIGS. 8A and 8B respectively show the frequency control loop gain $L_\omega(s)$ and phase control loop gain $L_\theta(s)$ for different synchronizer ratings. Synchronizer ratings in FIG. 8A and FIG. 8B are represented as percentage of the total generator rating.

Figure 10:
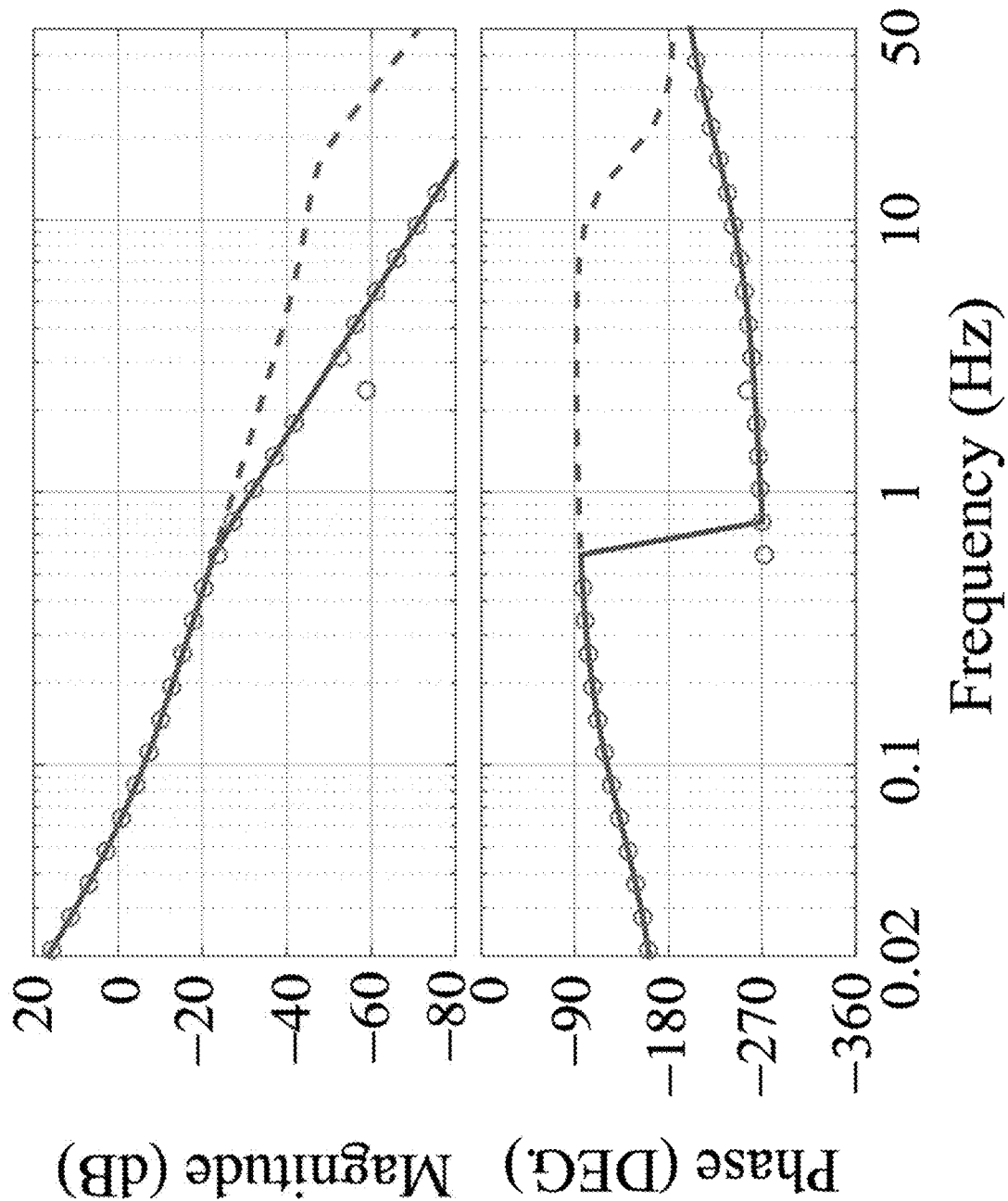
FIG. 10 is an exemplar graphic plot of verification of phase control loop gain model, wherein the solid lines show model response for synchronizer rating of 5%, circles show response obtained by point-by-point simulations, and dashed lines show response for the ideal synchronizer, according to some embodiments of the present disclosure.

FIG. 10 is an exemplar graphic plots of verification of phase control loop gain model, wherein the solid lines show model response for synchronizer rating of 5%, circles show response obtained by point-by-point simulations, and dashed lines show response for the ideal synchronizer, according to some embodiments of the present disclosure. Specifically, FIG. 10 validates the analytical model of the phase control loop gain against the simulated control diagram with the saturator block for the synchronizer of rating 5%.

It is evident from FIG. 8A that the frequency control bandwidth reduces as the converter based synchronizer rating is reduced. To avoid instability, the phase control bandwidth must be kept below the frequency at which the frequency control loop gain $L_\omega(s)$ starts decreasing at a fast rate due to the saturation block. This frequency, denoted by $\omega_e$, is approximate the same as the frequency at which amplitude A of the input signal to the saturation block becomes equal to the limit $P_C$. Also, at this point the gain of saturation block is unity. Hence, Eq. (10) at a can be written as $$\frac{P_c}{\pi} = \left| \frac{H_\theta(j\omega_c) \cdot H_\omega(j\omega_c)}{1 + H_\theta(j\omega_c) \cdot \frac{1}{2H \cdot j\omega_c}} \right| \tag{12}$$

Rearranging terms in (12), we get:

$$\frac{P_c}{\pi} = \left[ \frac{H_\theta(j\omega_c)}{\frac{1}{2H \cdot j\omega_c}} \right] \cdot \left[ \frac{H_\theta(j\omega_c) \cdot \frac{1}{2H \cdot j\omega_c}}{1 + H_\theta(j\omega_c) \cdot \frac{1}{2H \cdot j\omega_c}} \right] \tag{13}$$

Term in the second set of brackets in (13) represent the frequency control closed loop gain when saturation due to the limited synchronizer rating is not considered. As $\omega_c$ is well below the frequency control bandwidth, the term in the second set of brackets is approximately equal to unity at $\omega_c$. Hence, (13) simplifies to $$\frac{P_c}{\pi} = 2H \cdot j\omega_c \cdot H_\theta(j\omega_c). \tag{14}$$

Assuming that $H_\theta(s)$ is realized by a PI compensator and the zero introduced by the PI compensator is located kept at the phase control bandwidth $\omega_\theta$ for obtaining the phase margin of 45°, we get:

$$H_\theta(s) = \left[ \frac{\omega_\theta^2}{2\pi \cdot 60 \cdot \sqrt{2}} \right] \cdot \left[ \frac{1 + \frac{s}{\omega_\theta}}{s} \right] \tag{15}$$

Gain on the right hand side ensures that the magnitude of the phase control loop gain $L_\theta(s)$ is unity at $\omega_\theta$.

Using (14) and (15), we get $$\frac{P_c}{\pi} = \sqrt{2} H \cdot \frac{\omega_\theta^2}{2\pi \cdot 60 \cdot \sqrt{2}} \sqrt{1 + \left(\frac{\omega_c}{\omega_\theta}\right)^2} \tag{16}$$

According to (16), the critical frequency, $\omega_c$ can be determined as:

$$\omega_c = \frac{\sqrt{\frac{(2\pi \cdot 60 \cdot P_c)^2}{2} - (H \cdot \pi \cdot \omega_\theta^2)^2}}{H \cdot \pi \cdot \omega_\theta} \tag{17}$$

For stability, the phase control bandwidth must be kept below the critical frequency $\omega_c$, as phase of the loop gain decreases rapidly beyond $\omega_c$, and sufficient phase margin cannot be achieved.

Hence, using (17), the following design condition must be satisfied for stability $$\omega_\theta < \frac{\sqrt{\frac{(2\pi \cdot 60 \cdot P_c)^2}{2} - (H \cdot \pi \cdot \omega_\theta^2)^2}}{H \cdot \pi \cdot \omega_\theta}. \tag{18}$$

This condition can be simplified further and it can be shown that the phase control bandwidth in rad/s must satisfy the following inequality:

$$\omega_\theta (\text{in rad/s}) < \frac{\sqrt{60 \cdot P_c}}{H} \tag{19}$$

It is interesting to note that the limit on the phase control bandwidth is directly related to the synchronizer rating. Moreover, it is independent of the frequency control bandwidth. This is expected, as the frequency control bandwidth is usually much higher than the frequency range at which the saturating effect due to the synchronizer rating are manifested (refer FIGS. 8A and 8B).

For H=3.7 s and $P_C$=1%, using (19), the phase control bandwidth must be limited to 0.06 Hz. However, FIG. 8A shows that the phase control bandwidth must be below around 0.15 Hz for the same conditions. This is also corroborated by simulated responses in FIG. 9. The discrepancy is because we assumed that the loop gain starts rapidly decreasing right after amplitude A becomes equal to the synchronizer rating $P_C$. However, after hitting the limit, the loop gain first decreases only gradually before decreasing rapidly to a low value (FIG. 8A). Nonetheless, the design condition in (19) can be easily used as a thumb rule, leading to only slight conservative design.

Synchronizer Performance and Rating

This subsection relates total time for the synchronization with the rating of the converter based synchronizer. If the frequency difference between the generator and grid is Δf, the energy that need to be exchanged with the generator to equalize its frequency with the grid is given by $$E = \frac{1}{2} J \cdot (2\pi \cdot \Delta f)^2. \tag{20}$$

where J is the mechanical inertia of the generator in kg·m², and it is related with the inertia constant H as H as $$J = \frac{2H}{(2\pi \cdot 60)^2} VAbase. \quad (21)$$

Time required for the synchronizer of rating $P_c$ to exchange energy E from (20) is given by $$T_\omega = \frac{\frac{1}{2} \cdot \frac{2H}{(2\pi \cdot 60)^2} \cdot (2\pi \cdot \Delta f)^2}{P_c}. \quad (22)$$

This is the time synchronizer will take for locking the frequency of generator with that of the main electrical power system. Phase control is enabled after the frequency locking process is complete. The time for phase locking depends on the phase control bandwidth $\omega_\theta$. It is approximately given by $$T_\theta \approx \frac{4}{\omega_\theta} > \frac{4}{\sqrt{\frac{60 \cdot P_c}{H}}}. \quad (23)$$

Sum of frequency and phase locking time from (22) and (23) gives the total synchronization time. It is evident that a lower rating of the disclosed converter based synchronizer increases the time required for the synchronization process. Hence, there is a trade-off between the cost of the converter based synchronizer and performance of the synchronization process.

Figure 11:
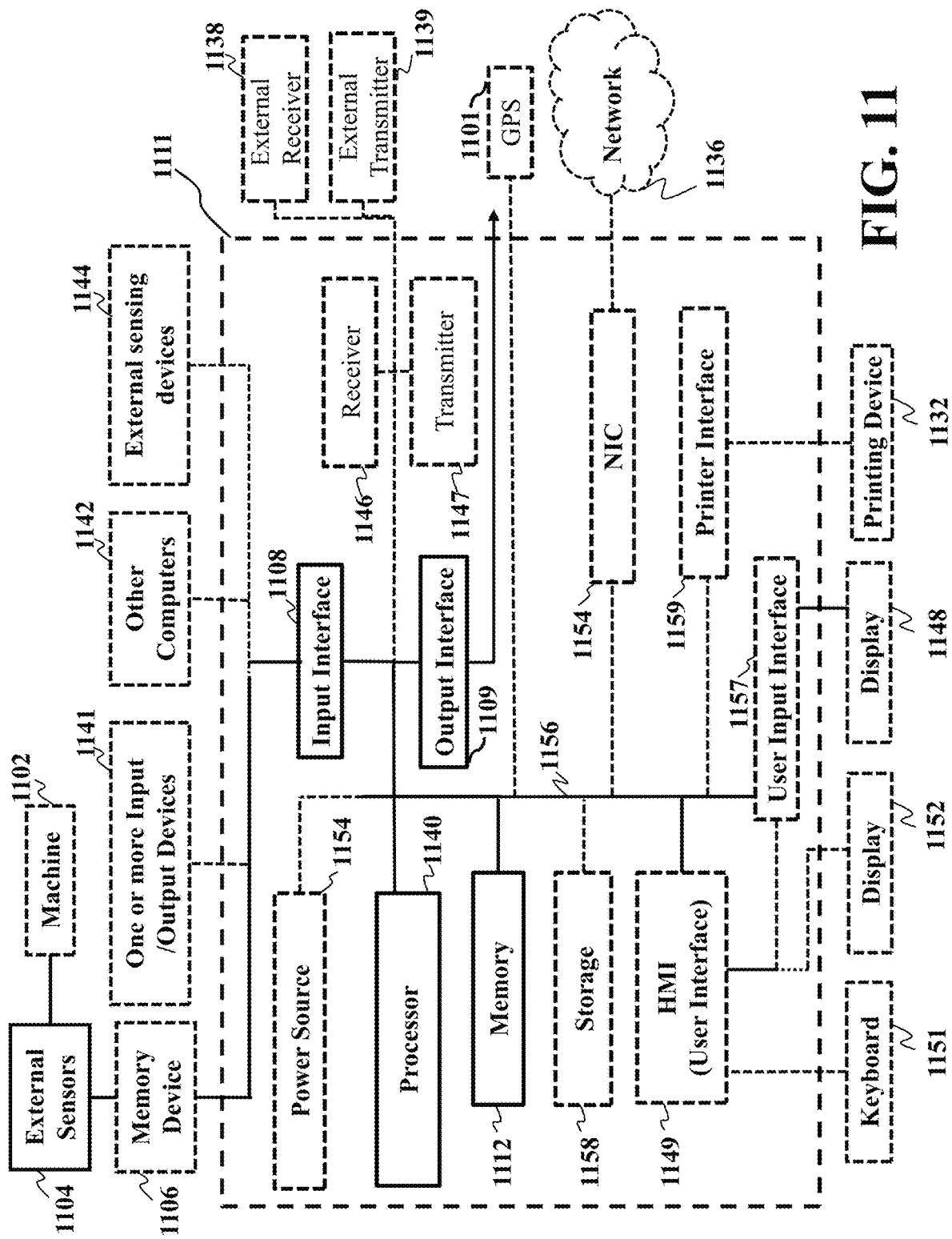
FIG. 11 is a block diagram of illustrating the method of FIG. 1A, that can be implemented using an alternate computer or processor, according to embodiments of the present disclosure.

FIG. 11 is a block diagram of illustrating the method of FIG. 1A, that can be implemented using an alternate controller, according to embodiments of the present disclosure. The controller 1111 includes a processor 1140, computer readable memory 1112, storage 1158 and user interface 1149 with display 1152 and keyboard 1151, which are connected through bus 1156. For example, the user interface 1149 in communication with the processor 1140 and the computer readable memory 1112, acquires and stores the data in the computer readable memory 1112 upon receiving an input from a surface, keyboard surface, of the user interface 1157 by a user.

Contemplated is that the memory 1112 can store instructions that are executable by the processor, historical data, and any data to that can be utilized by the methods and systems of the present disclosure. The processor 1140 can be a single core processor, a multi-core processor, a computing cluster, or any number of other configurations. The processor 1140 can be connected through a bus 1156 to one or more input and output devices. The memory 1112 can include random access memory (RAM), read only memory (ROM), flash memory, or any other suitable memory systems.

Still referring to FIG. 11, a storage device 1158 can be adapted to store supplementary data and/or software modules used by the processor. For example, the storage device 1158 can store historical data and other related data as mentioned above regarding the present disclosure. Additionally, or alternatively, the storage device 1158 can store historical data similar to data as mentioned above regarding the present disclosure. The storage device 1158 can include a hard drive, an optical drive, a thumb-drive, an array of drives, or any combinations thereof.

The system can be linked through the bus 1156 optionally to a display interface (not shown) adapted to connect the system to a display device (not shown), wherein the display device can include a computer monitor, camera, television, projector, or mobile device, among others.

The controller 1111 can include a power source 1154, depending upon the application the power source 1154 may be optionally located outside of the controller 1111. Linked through bus 1156 can be a user input interface 1157 adapted to connect to a display device 1148, wherein the display device 1148 can include a computer monitor, camera, television, projector, or mobile device, among others. A printer interface 1159 can also be connected through bus 1156 and adapted to connect to a printing device 1132, wherein the printing device 1132 can include a liquid inkjet printer, solid ink printer, large-scale commercial printer, thermal printer, UV printer, or dye-sublimation printer, among others. A network interface controller (NIC) 1134 is adapted to connect through the bus 1156 to a network 1136, wherein data or other data, among other things, can be rendered on a third party display device, third party imaging device, and/or third party printing device outside of the controller 1111.

Still referring to FIG. 11, the data or other data, among other things, can be transmitted over a communication channel of the network 1136, and/or stored within the storage system 1158 for storage and/or further processing. Further, the data or other data may be received wirelessly or hard wired from a receiver 1146 (or external receiver 1138) or transmitted via a transmitter 1147 (or external transmitter 1139) wirelessly or hard wired, the receiver 1146 and transmitter 1147 are both connected through the bus 1156. The controller 1111 may be connected via an input interface 1108 to external sensing devices 1144 and external input/output devices 1141. The controller 1111 may be connected to other external computers 1142. An output interface 1109 may be used to output the processed data from the processor 1140.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A power system, comprising:
    a first grid including a first generator having first power flow parameters, and a second grid including a second generator having second power flow parameters;
    a breaker installed at a point of common coupling between the first grid and the second grid, wherein the breaker in an open position separates the first grid from the second grid, and in a close position connects the first grid with the second grid;

a first sensor located on a side of the point of the common coupling for continually determining the power flow parameters of the first grid, and a second sensor located on an other side of the point of the common coupling for continually determining the power flow parameters of the second grid, wherein the power flow parameters for the first and the second grid are indicative of at least a frequency and a phase;

a converter that is a voltage source based converter is for supplying power to either the first grid or the second grid; and a controller in communication with the sensors and the converter, to synchronize at least the phases and the frequencies of the first and the second grid, by continually adjusting an amount of power supplied from the converter, based on continually determining a frequency mismatch and a phase mismatch between the first grid and the second grid, until a first predetermined condition is met, wherein the controller includes a phase-control compensator to control phase matching between the first and the second grids, a frequency-control compensator to control frequency matching between the first and the second grids, and a converter power rating based saturation block to limit a maximum power output of the converter, so that a power rating of the converter is determined based on a synchronization time between the first and the second grids, such that the synchronization time is a sum of a frequency locking time and a phase locking time, wherein the breaker changes position from the open position to the close position, when the first predetermined condition is met.

2. The power system of claim 1, wherein the first and the second sensors are a phase-locked loop type sensor that receives three phase voltages when connected the first grid and the second grid, so as to determine a frequency and a phase angle.

3. The power system of claim 1, wherein the first predetermined condition is determined based on differences of at least two power flow parameters between the first grid and the second grid, such that an amount of the differences is less than a predetermined threshold, such that the power flow parameters are from the group consisting of a frequency, a phase angle, a voltage magnitude and a phase sequence.

4. The power system of claim 1, wherein the converter is a two-level voltage source converter connected to a DC voltage source, such that the converter injects or extracts three-phase currents to the connected first grid or the second grid.

5. The power system of claim 4, wherein the three-phase currents are continually adjusted by a dq-domain current control of the controller, based on the continually adjusted amount of power determined by the controller, and wherein a bandwidth of the dq-domain current control is set lower than a switching frequency of the converter.

6. The power system of claim 5, wherein a bandwidth of the frequency-control compensator is set lower than the bandwidth of the dq-domain current control, and wherein a bandwidth of the phase-control compensator is set lower than the bandwidth of the frequency-control compensator.

7. The power system of claim 6, wherein the phase-control compensator uses a phase mismatch to determine a frequency reference for the frequency-control compensator, such that the phase mismatch is determined as a difference of phase angles between the first and the second grids, and wherein the phase control is activated only after the frequency mismatch met the first predetermined condition, such that the frequency mismatch is determined as a difference of a frequency between the first and the second grids.

8. The power system of claim 6, wherein the frequency-control compensator determines the continually adjusted amount of power supplied from the converter, based on the determined frequency reference from the phase-control compensator and the frequency mismatch between the first and the second grids, and wherein the frequency-control compensator includes an anti-windup scheme that clamps an output of the frequency control compensator to a power rating of a synchronizer and also stops integrating an input of the frequency control compensator, whenever the output goes beyond a power rating limit, wherein the anti-windup scheme is implemented within the frequency control compensator to increase a control stability of the controller.

9. The power system of claim 6, wherein the saturation block limits an output of the frequency-control compensator with a saturation limit.

10. The power system of claim 9, wherein the synchronization time is the sum of the frequency locking time and the phase locking time, in which the frequency locking time is determined based on a ratio of an exchange energy between the first and the second grids and the power rating of the convertor, such that the exchange energy is determined based on an initial frequency difference between the first and the second grids and a mechanical inertia of either the first grid or the second grid, connected to the converter, and wherein the phase locking time is determined according to the bandwidth of the phase-control compensator, and the bandwidth of the phase-control compensator is determined based on an inertia constant of either the first grid or the second grid, connected to the convertor and the power rating of the converter.

11. A synchronizer for a power system including a first grid having a first generator with first power flow parameters, a second grid having a second generator with second power flow parameters, and a breaker installed at a point of common coupling between the first grid and the second grid, wherein the breaker in an open position separates the first grid from the second grid, and in a close position connects the first grid with the second grid, the synchronizer comprising:

a first sensor located on a side of the point of the common coupling for continually determining the power flow parameters of the first grid, and a second sensor located on an other side of the point of the common coupling for continually determining the power flow parameters of the second grid, wherein the power flow parameters of the first and the second grid are indicative of at least a frequency and a phase;

a converter that is a voltage source based converter is for supplying power to either the first grid or the second grid; and a controller in communication with the sensors and the converter, to synchronize at least the phases and the frequencies of the first and the second grid, by continually adjusting an amount of power supplied from the converter, based on continually determining a frequency mismatch and a phase mismatch between the first grid and the second grid, until a first predetermined condition is met, wherein the controller includes a phase-control compensator to control phase matching between the first and the second grids, a frequency-control compensator to control frequency matching between the first and the second grids, and a converter power rating based saturation block to limit a maximum power output of the converter, so that a power rating of the converter is determined based on a synchronization time between the first and the second grids, such that the synchronization time is a sum of a frequency locking time and a phase locking time, wherein the breaker changes position from the open position to the close position, when the first predetermined condition is met.

12. The synchronizer of claim 11, wherein the converter is a two-level voltage source converter connected to a DC voltage source, such that the converter injects three-phase currents to the connected first grid or the second grid, wherein the three-phase currents are continually adjusted by a dq-domain current control of the controller, based on the continually adjusted amount of power determined by the controller, and wherein a bandwidth of the dq-domain current control is set lower than a switching frequency of the converter.

13. The synchronizer of claim 12, wherein wherein a bandwidth of the frequency-control compensator is set lower than the bandwidth of the dq-domain current control, wherein a bandwidth of the phase-control compensator is set lower than the bandwidth of the frequency-control compensator, wherein the phase-control compensator uses a phase mismatch to determine a frequency reference for the frequency-control compensator, wherein the phase mismatch is determined as a difference of phase angles between the first and the second grids, and wherein the phase control is activated only after the frequency mismatch is met the first predetermined condition, such that the frequency mismatch is determined as a difference of a frequency between the first and the second grids.

14. A synchronizer for a power system including a generator having first power flow parameters, a grid having a grid generator having second power flow parameters, and a breaker installed at a point of common coupling between the generator and the grid, wherein the breaker in an open position separates the generator from the grid, and in a close position connects the generator with the grid, the synchronizer comprising:
a first sensor located on a side of the point of the common coupling for continually determining power flow parameters of the generator, and a second sensor located on an other side of the point of the common coupling for continually determining power flow parameters of the grid, wherein the power flow parameters for the generator and the grid are indicative of at least a frequency and a phase angle;
a converter that is a voltage source based converter is for supplying power to either the generator or the grid; and
a controller in communication with the sensors and the converter, to synchronize at least the phases and the frequencies of the generator and the grid, by continually adjusting an amount of power supplied from the converter, based on continually determining a frequency mismatch and a phase mismatch between the generator and the grid, until a first predetermined condition is met, wherein the controller includes a phase-control compensator to control phase matching between the first and the second grids, a frequency-control compensator to control frequency matching between the first and the second grids, and a converter power rating based saturation block to limit a maximum power output of the converter, so that a power rating of the converter is determined based on a synchronization time between the first and the second grids, such that the synchronization time is a sum of a frequency locking time and a phase locking time, wherein the breaker changes position from the open position to the close position, when the first predetermined condition is met.

15. The power system of claim 14, further comprising:
receiving a user input on a surface of at least one user input interface in communication with the controller to set the first predetermined condition.

16. The synchronizer of claim 14, wherein the converter is a two-level voltage source converter connected to a DC voltage source, such that the converter injects three-phase currents to the connected first grid or the second grid.

17. The synchronizer of claim 16, wherein the three-phase currents are continually adjusted by a dq-domain current control of the controller, based on the continually adjusted amount of power determined by the controller, and wherein a bandwidth of the dq-domain current control is set lower than a switching frequency of the converter.

18. The synchronizer of claim 17, wherein a bandwidth of the frequency-control compensator is set lower than the bandwidth of the dq-domain current control, wherein a bandwidth of the phase-control compensator is set lower than the bandwidth of the frequency-control compensator, and wherein the saturation block limits an output of the frequency-control compensator with a saturation limit.

19. The synchronizer of claim 18, wherein the phase-control compensator uses a phase mismatch to determine a frequency reference for the frequency-control compensator, wherein the phase mismatch is determined as a difference of phase angles between the first and the second grids, and wherein the phase control is activated only after the frequency mismatch is reduced below a predetermined tolerance, such that the frequency mismatch is determined as a difference of a frequency between the first and the second grids.

20. The synchronizer of claim 18, wherein the frequency-control compensator determines the continually adjusted amount of power supplied from the converter, based on the determined frequency reference from the phase-control compensator and the frequency mismatch between the first and the second grids, and wherein the frequency-control compensator includes an anti-windup scheme that clamps an output of the frequency control compensator to a power rating of a synchronizer and also stops integrating an input of the frequency control compensator, whenever the output goes beyond a power rating limit, wherein the anti-windup scheme is implemented within the frequency control compensator to increase a control stability of the controller.

* * * * *